US011829928B2

(12) United States Patent
McCardel et al.

(10) Patent No.: US 11,829,928 B2
(45) Date of Patent: Nov. 28, 2023

(54) MISALIGNMENT DETECTION SYSTEM FOR EFFICIENTLY PROCESSING DATABASE-STORED DATA AND AUTOMATICALLY GENERATING MISALIGNMENT INFORMATION FOR DISPLAY IN INTERACTIVE USER INTERFACES

(71) Applicant: Palantir Technologies Inc., Palo Alto, CA (US)

(72) Inventors: Barry McCardel, New York, NY (US); Boris Valensi, San Francisco, CA (US); James Ong, New York, NY (US); Galen Marchetti, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 592 days.

(21) Appl. No.: 16/444,997

(22) Filed: Jun. 18, 2019

(65) Prior Publication Data

US 2019/0303856 A1      Oct. 3, 2019

Related U.S. Application Data

(63) Continuation of application No. 15/167,856, filed on May 27, 2016, now Pat. No. 10,373,099.
(Continued)

(51) Int. Cl.
*G06Q 10/08*         (2023.01)
*G06Q 10/0833*       (2023.01)
(Continued)

(52) U.S. Cl.
CPC ......... *G06Q 10/0833* (2013.01); *G06F 16/29* (2019.01); *G06Q 50/28* (2013.01)

(58) Field of Classification Search
CPC ..... G06Q 10/0833; G06Q 50/28; G06F 16/29
See application file for complete search history.

(56) References Cited

U.S. PATENT DOCUMENTS 6,430,305 B1     8/2002   Decker
6,820,135 B1    11/2004   Dingman
(Continued)

FOREIGN PATENT DOCUMENTS

CN     102546446       7/2012
CN     103167093       6/2013
(Continued)

OTHER PUBLICATIONS

Korzeniowski, Paul, "GIS software getting business data on map; cheaper hardware, PC software packages, U.S. Census Tigr format widen user base," Software Magazine, 13.n7, King Content Co. / Software Magazine, May 1993, p. 96(4).*
(Continued)

*Primary Examiner* — Nathan Erb
(74) *Attorney, Agent, or Firm* — Knobbe, Martens, Olson & Bear, LLP

(57) ABSTRACT

Various systems and methods are provided that integrate data from disparate sources to identify shipment misalignments and display such information in interactive user interfaces. For example, the systems described herein can define various geographic regions using location and census data and identify the defined geographic regions in which stores are located. Using shipment data and micro-market data, the systems described herein can then identify the geographic regions that items are shipped to, identify the demand for such items in the geographic regions, and determine whether the quantity of items shipped to the geographic regions is appropriate based on the demand. Such information can be displayed in an interactive user interface that allows a user to view the geographic clustering
(Continued)

of item demand, identify potential opportunities for correcting shipment misalignment, and/or correct identified shipment misalignments.

21 Claims, 16 Drawing Sheets

Related U.S. Application Data

(60) Provisional application No. 62/269,612, filed on Dec. 18, 2015.

(51) Int. Cl.
*G06F 16/29* (2019.01)
*G06Q 50/28* (2012.01)

(56) References Cited

U.S. PATENT DOCUMENTS

| | | | |
|---|---|---|---|
| 6,978,419 | B1 | 12/2005 | Kantrowitz |
| 6,980,984 | B1 | 12/2005 | Huffman et al. |
| 7,168,039 | B2 | 1/2007 | Bertram |
| 7,617,232 | B2 | 11/2009 | Gabbert et al. |
| 7,756,843 | B1 | 7/2010 | Palmer |
| 7,899,796 | B1 | 3/2011 | Borthwick et al. |
| 7,917,376 | B2 | 3/2011 | Bellin et al. |
| 7,941,321 | B2 | 5/2011 | Greenstein et al. |
| 8,036,971 | B2 | 10/2011 | Aymeloglu et al. |
| 8,046,283 | B2 | 10/2011 | Burns |
| 8,054,756 | B2 | 11/2011 | Chand et al. |
| 8,214,490 | B1 | 7/2012 | Vos et al. |
| 8,229,902 | B2 | 7/2012 | Vishniac et al. |
| 8,290,838 | B1 | 10/2012 | Thakur et al. |
| 8,302,855 | B2 | 11/2012 | Ma et al. |
| 8,311,901 | B1* | 11/2012 | Carmichael .......... G06Q 10/087 705/28 |
| 8,392,556 | B2 | 3/2013 | Goulet et al. |
| 8,473,454 | B2 | 6/2013 | Evanitsky et al. |
| 8,484,115 | B2 | 7/2013 | Aymeloglu et al. |
| 8,589,273 | B2 | 11/2013 | Creeden et al. |
| 8,688,573 | B1 | 4/2014 | Ruknoic et al. |
| 8,700,586 | B2* | 4/2014 | Celik ................. G06Q 30/0277 707/705 |
| 8,744,890 | B1 | 6/2014 | Bernier |
| 8,812,960 | B1 | 8/2014 | Sun et al. |
| 8,924,388 | B2 | 12/2014 | Elliot et al. |
| 8,924,389 | B2 | 12/2014 | Elliot et al. |
| 8,938,686 | B1 | 1/2015 | Erenrich et al. |
| 8,949,164 | B1 | 2/2015 | Mohler |
| 9,100,428 | B1 | 8/2015 | Visbal |
| 9,129,219 | B1 | 9/2015 | Robertson et al. |
| 10,373,099 | B1* | 8/2019 | McCardel .......... G06Q 10/0833 |
| 10,915,843 | B1* | 2/2021 | Shariff ................... G06Q 40/00 |
| 2002/0029226 | A1* | 3/2002 | Li ........................... G06F 16/00 |
| 2002/0065708 | A1 | 5/2002 | Senay et al. |
| 2002/0095360 | A1 | 7/2002 | Joao |
| 2002/0095658 | A1 | 7/2002 | Shulman |
| 2002/0103705 | A1 | 8/2002 | Brady |
| 2002/0147805 | A1 | 10/2002 | Leshem et al. |
| 2003/0036848 | A1 | 2/2003 | Sheha et al. |
| 2003/0061132 | A1 | 3/2003 | Mason et al. |
| 2003/0126102 | A1 | 7/2003 | Borthwick |
| 2003/0172014 | A1 | 9/2003 | Quackenbush et al. |
| 2004/0034570 | A1 | 2/2004 | Davis |
| 2004/0111480 | A1 | 6/2004 | Yue |
| 2004/0153418 | A1 | 8/2004 | Hanweck |
| 2004/0236688 | A1 | 11/2004 | Bozeman |
| 2005/0010472 | A1 | 1/2005 | Quatse et al. |
| 2005/0086207 | A1 | 4/2005 | Heuer et al. |
| 2005/0154628 | A1 | 7/2005 | Eckart et al. |
| 2005/0154769 | A1 | 7/2005 | Eckart et al. |
| 2006/0026120 | A1 | 2/2006 | Carolan et al. |
| 2006/0143034 | A1 | 6/2006 | Rothermel |
| 2006/0143075 | A1 | 6/2006 | Carr et al. |
| 2006/0143079 | A1 | 6/2006 | Basak et al. |
| 2007/0000999 | A1 | 1/2007 | Kubo et al. |
| 2007/0011304 | A1 | 1/2007 | Error |
| 2007/0038646 | A1 | 2/2007 | Thota |
| 2007/0100802 | A1* | 5/2007 | Celik ..................... G06F 16/24 |
| 2007/0150801 | A1 | 6/2007 | Chidlovskii et al. |
| 2007/0156673 | A1 | 7/2007 | Maga |
| 2007/0185867 | A1 | 8/2007 | Maga |
| 2007/0284433 | A1 | 12/2007 | Domenica et al. |
| 2008/0040275 | A1 | 2/2008 | Paulsen et al. |
| 2008/0069081 | A1 | 3/2008 | Chand et al. |
| 2008/0103996 | A1 | 5/2008 | Forman et al. |
| 2008/0222295 | A1 | 9/2008 | Robinson et al. |
| 2008/0243711 | A1 | 10/2008 | Aymeloglu et al. |
| 2008/0249983 | A1 | 10/2008 | Meisels et al. |
| 2008/0255973 | A1 | 10/2008 | El Wade et al. |
| 2008/0313132 | A1 | 12/2008 | Hao et al. |
| 2009/0076845 | A1 | 3/2009 | Bellin et al. |
| 2009/0094166 | A1 | 4/2009 | Aymeloglu et al. |
| 2009/0106178 | A1 | 4/2009 | Chu |
| 2009/0112745 | A1 | 4/2009 | Stefanescu |
| 2009/0125359 | A1 | 5/2009 | Knapic |
| 2009/0125459 | A1 | 5/2009 | Norton et al. |
| 2009/0164294 | A1* | 6/2009 | Hu ......................... G06Q 30/08 705/7.31 |
| 2009/0187546 | A1 | 7/2009 | Whyte et al. |
| 2009/0187548 | A1 | 7/2009 | Ji et al. |
| 2009/0249244 | A1 | 10/2009 | Robinson et al. |
| 2009/0259569 | A1* | 10/2009 | Narea .................. G06Q 10/087 705/28 |
| 2009/0271343 | A1 | 10/2009 | Vaiciulis et al. |
| 2009/0307049 | A1 | 12/2009 | Elliott et al. |
| 2009/0313463 | A1 | 12/2009 | Pang et al. |
| 2009/0319418 | A1 | 12/2009 | Herz |
| 2009/0319891 | A1 | 12/2009 | MacKinlay |
| 2010/0030722 | A1 | 2/2010 | Goodson et al. |
| 2010/0031141 | A1 | 2/2010 | Summers et al. |
| 2010/0042922 | A1 | 2/2010 | Bradateanu et al. |
| 2010/0057622 | A1 | 3/2010 | Faith et al. |
| 2010/0070842 | A1 | 3/2010 | Aymeloglu et al. |
| 2010/0076813 | A1 | 3/2010 | Ghosh et al. |
| 2010/0098318 | A1 | 4/2010 | Anderson |
| 2010/0114887 | A1 | 5/2010 | Conway et al. |
| 2010/0131502 | A1 | 5/2010 | Fordham |
| 2010/0161735 | A1 | 6/2010 | Sharma |
| 2010/0191563 | A1 | 7/2010 | Schlaifer et al. |
| 2010/0235915 | A1 | 9/2010 | Memon et al. |
| 2010/0262688 | A1 | 10/2010 | Hussain et al. |
| 2010/0312837 | A1 | 12/2010 | Bodapati et al. |
| 2011/0004498 | A1 | 1/2011 | Readshaw |
| 2011/0061013 | A1 | 3/2011 | Bilicki et al. |
| 2011/0078173 | A1 | 3/2011 | Seligmann et al. |
| 2011/0093327 | A1 | 4/2011 | Fordyce, III et al. |
| 2011/0099133 | A1 | 4/2011 | Chang et al. |
| 2011/0153384 | A1 | 6/2011 | Horne et al. |
| 2011/0161137 | A1 | 6/2011 | Ubalde et al. |
| 2011/0173093 | A1 | 7/2011 | Psota et al. |
| 2011/0208565 | A1 | 8/2011 | Ross et al. |
| 2011/0213655 | A1 | 9/2011 | Henkin |
| 2011/0218955 | A1 | 9/2011 | Tang |
| 2011/0270604 | A1 | 11/2011 | Qi et al. |
| 2011/0270834 | A1 | 11/2011 | Sokolan et al. |
| 2011/0289397 | A1 | 11/2011 | Eastmond et al. |
| 2011/0295649 | A1 | 12/2011 | Fine |
| 2011/0314007 | A1 | 12/2011 | Dassa et al. |
| 2011/0314024 | A1 | 12/2011 | Chang et al. |
| 2012/0011238 | A1 | 1/2012 | Rathod |
| 2012/0011245 | A1 | 1/2012 | Gillette et al. |
| 2012/0022945 | A1 | 1/2012 | Falkenborg et al. |
| 2012/0054284 | A1 | 3/2012 | Rakshit |
| 2012/0059853 | A1 | 3/2012 | Jagota |
| 2012/0066166 | A1 | 3/2012 | Curbera et al. |
| 2012/0079363 | A1 | 3/2012 | Folting et al. |
| 2012/0084117 | A1 | 4/2012 | Tavares et al. |
| 2012/0084287 | A1 | 4/2012 | Lakshminarayan et al. |
| 2012/0116828 | A1 | 5/2012 | Shannon |
| 2012/0123673 | A1* | 5/2012 | Perks ................. G06Q 30/0625 701/426 |
| 2012/0131512 | A1 | 5/2012 | Takeuchi et al. |

(56) References Cited

U.S. PATENT DOCUMENTS

| | | |
|---|---|---|
| 2012/0159362 A1 | 6/2012 | Brown et al. |
| 2012/0173381 A1 | 7/2012 | Smith |
| 2012/0179505 A1* | 7/2012 | McMains ............... G06Q 10/04 |
| | | 705/7.25 |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2014/0012796 A1 | 1/2014 | Petersen et al. |
| 2014/0040371 A1 | 2/2014 | Gurevich et al. |
| 2014/0058794 A1 | 2/2014 | Malov et al. |
| 2014/0058914 A1 | 2/2014 | Song et al. |
| 2014/0068487 A1 | 3/2014 | Steiger et al. |
| 2014/0089339 A1 | 3/2014 | Siddiqui et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0258246 A1 | 9/2014 | Lo Faro et al. |
| 2014/0289073 A1* | 9/2014 | Gold ................... G06Q 30/0639 |
| | | 705/26.9 |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2014/0370972 A1* | 12/2014 | Mullen ................... G06Q 50/34 |
| | | 463/25 |
| 2014/0380237 A1* | 12/2014 | Kroupa ............... G06F 3/04883 |
| | | 715/781 |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0135256 A1 | 5/2015 | Hoy et al. |
| 2015/0188872 A1 | 7/2015 | White |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0055495 A1 | 2/2016 | Qin et al. |
| 2016/0055501 A1 | 2/2016 | Mukherjee et al. |
| 2016/0125345 A1* | 5/2016 | Majumdar ............ G06F 16/248 |
| | | 705/7.39 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2988258 | 2/2016 |
| WO | WO 2005/116851 | 12/2005 |

OTHER PUBLICATIONS

AMNET, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics"and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

DISTIMO—App Analytics, <http://www.distimo.com/app-analytics> Printed Jul. 18, 2013 in 5 pages.

Ferreira et al., "A Scheme for Analyzing Electronic Payment Systems," Basil 1997.

Flurry Analytics, <http://www.flurry.com/> Printed Jul. 18, 2013 in 14 pages.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services", HiPC 2006, LNCS 4297, pp. 277-288, 2006.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

(56) References Cited

OTHER PUBLICATIONS

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kontagent Mobile Analytics, <http://www.kontagent.com/> Printed Jul. 18, 2013 in 9 pages.

Localytics—Mobile App Marketing & Analytics, <http://www.localytics.com/> Printed Jul. 18, 2013 in 12 pages.

Manno et al., "Introducing Collaboration in Single-user Applications through the Centralized Control Architecture," 2010, pp. 10.

McClave et al., "Statistics for Business and Economics", 2001, pp. 86-96.

Mixpanel—Mobile Analytics, <https://mixpanel.com/> Printed Jul. 18, 2013 in 13 pages.

Open Web Analytics (OWA), <http://www.openwebanalytics.com/> Printed Jul. 19, 2013 in 5 pages.

Piwik—Free Web Analytics Software. <http://piwik.org/> Printed Jul. 19, 2013 in 18 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Sigrist, et al., "PROSITE, a Protein Domain Database for Functional Characterization and Annotation," Nucleic Acids Research, 2010, vol. 38, pp. D161-D166.

StatCounter—Free Invisible Web Tracker, Hit Counter and Web Stats, <http://statcounter.com/> Printed Jul. 19, 2013 in 17 pages.

TestFlight—Beta Testing on the Fly, <http://testflightapp.com/> Printed Jul. 18, 2013 in 3 pages.

Trak.io, <http://trak.io/> printed Jul. 18, 2013 in 3 pages.

UserMetrix, <http://usermetrix.com/android-analytics> printed Jul. 18, 2013 in 3 pages.

Valentini et al., "Ensembles of Learning Machines", M. Marinaro and R. Tagliaferri (Eds.): WIRN VIETRI 2002, LNCS 2486, pp. 3-20.

Vose et al., "Help File for ModelRisk Version 5," Vose Software, pp. 349-353. [Uploaded in 2 Parts].

Wang et al., "Research on a Clustering Date De-Duplication Mechanism Based on Bloom Filter," IEEE 2010, 5 pages.

Wikipedia, "Multimap," Jan. 1, 2013, https://en.wikipedia.org/w/index.php?title=Multimap&oldid=530800748.

Notice of Allowance for U.S. Appl. No. 14/225,084 dated May 4, 2015.

Notice of Allowance for U.S. Appl. No. 14/319,161 dated May 4, 2015.

Notice of Allowance for U.S. Appl. No. 14/323,935 dated Oct. 1, 2015.

Notice of Allowance for U.S. Appl. No. 14/479,863 dated Mar. 31, 2015.

Notice of Allowance for U.S. Appl. No. 14/552,336 dated Nov. 3, 2015.

Notice of Allowance for U.S. Appl. No. 14/746,671 dated Jan. 21, 2016.

Official Communication for European Patent Application No. 14187996.5 dated Feb. 12, 2015.

Official Communication for European Patent Application No. 14191540.5 dated May 27, 2015.

Official Communication for European Patent Application No. 14200246.8 dated May 29, 2015.

Official Communication for European Patent Application No. 14200298.9 dated May 13, 2015.

Official Communication for European Patent Application No. 15181419.1 dated Sep. 29, 2015.

Official Communication for European Patent Application No. 15184764.7 dated Dec. 14, 2015.

Official Communication for Great Britain Patent Application No. 1404486.1 dated May 21, 2015.

Official Communication for Great Britain Patent Application No. 1404486.1 dated Aug. 27, 2014.

Official Communication for Great Britain Patent Application No. 1404489.5 dated May 21, 2015.

Official Communication for Great Britain Patent Application No. 1404489.5 dated Aug. 27, 2014.

Official Communication for Great Britain Patent Application No. 1404499.4 dated Jun. 11, 2015.

Official Communication for Great Britain Patent Application No. 1404499.4 dated Aug. 20, 2014.

Official Communication for Netherlands Patent Application No. 2012417 dated Sep. 18, 2015.

Official Communication for Netherlands Patent Application No. 2012421 dated Sep. 18, 2015.

Official Communication for Netherlands Patent Application No. 2012438 dated Sep. 21, 2015.

Official Communication for New Zealand Patent Application No. 622473 dated Jun. 19, 2014.

Official Communication for New Zealand Patent Application No. 622473 dated Mar. 27, 2014.

Official Communication for New Zealand Patent Application No. 622513 dated Apr. 3, 2014.

Official Communication for New Zealand Patent Application No. 628161 dated Aug. 25, 2014.

Official Communication for U.S. Appl. No. 13/827,491 dated Dec. 1, 2014.

Official Communication for U.S. Appl. No. 13/827,491 dated Jun. 22, 2015.

Official Communication for U.S. Appl. No. 13/827,491 dated Oct. 9, 2015.

Official Communication for U.S. Appl. No. 14/141,252 dated Oct. 8, 2015.

Official Communication for U.S. Appl. No. 14/225,006 dated Sep. 10, 2014.

Official Communication for U.S. Appl. No. 14/225,006 dated Sep. 2, 2015.

Official Communication for U.S. Appl. No. 14/225,006 dated Dec. 21, 2015.

Official Communication for U.S. Appl. No. 14/225,006 dated Feb. 27, 2015.

Official Communication for U.S. Appl. No. 14/225,084 dated Sep. 11, 2015.

Official Communication for U.S. Appl. No. 14/225,084 dated Sep. 2, 2014.

Official Communication for U.S. Appl. No. 14/225,084 dated Feb. 20, 2015.

Official Communication for U.S. Appl. No. 14/225,084 dated Jan. 4, 2016.

Official Communication for U.S. Appl. No. 14/225,160 dated Feb. 11, 2015.

Official Communication for U.S. Appl. No. 14/225,160 dated Aug. 12, 2015.

Official Communication for U.S. Appl. No. 14/225,160 dated May 20, 2015.

Official Communication for U.S. Appl. No. 14/225,160 dated Oct. 22, 2014.

Official Communication for U.S. Appl. No. 14/225,160 dated Jul. 29, 2014.

Official Communication for U.S. Appl. No. 14/306,138 dated Mar. 17, 2016.

Official Communication for U.S. Appl. No. 14/306,138 dated Dec. 24, 2015.

Official Communication for U.S. Appl. No. 14/306,138 dated Dec. 3, 2015.

Official Communication for U.S. Appl. No. 14/306,147 dated Dec. 24, 2015.

Official Communication for U.S. Appl. No. 14/306,147 dated Jun. 3, 2016.

Official Communication for U.S. Appl. No. 14/306,147 dated Mar. 4, 2016.

(56) References Cited

OTHER PUBLICATIONS

Official Communication for U.S. Appl. No. 14/306,154 dated Feb. 1, 2016.
Official Communication for U.S. Appl. No. 14/306,154 dated Mar. 17, 2016.
Official Communication for U.S. Appl. No. 14/319,161 dated Jan. 23, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated May 12, 2016.
Official Communication for U.S. Appl. No. 14/463,615 dated Nov. 13, 2014.
Official Communication for U.S. Appl. No. 14/463,615 dated Aug. 19, 2016.
Official Communication for U.S. Appl. No. 14/463,615 dated Mar. 21, 2016.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/562,524 dated Feb. 18, 2016.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/811,649 dated May 18, 2016.
Official Communication for U.S. Appl. No. 14/813,749 dated Sep. 28, 2015.
Official Communication for U.S. Appl. No. 14/842,734 dated Nov. 19, 2015.
Notice of Allowance for U.S. Appl. No. 15/167,856 dated Mar. 21, 2019.
Official Communication for U.S. Appl. No. 15/167,856 dated Jan. 19, 2018.
Official Communication for U.S. Appl. No. 15/167,856 dated Jun. 7, 2017.
U.S. Pat. No. 10,373,099, Misalignment Detection System for Efficiently Processing Database-Stored Data and Automatically Generating Misalignment Information for Display in Interactive User Interfaces, Aug. 6, 2019.

* cited by examiner

OPPORTUNITY ANALYSIS FOR [ HALLOWEEN ▶ ] — 410

415 [Download ▼]  420 [Sort ▼]

WAREHOUSES

| ID | Name | # of Stores | Stores Unserved (%) | Total Shipments ($) | Shipments Unserved (%) | Seasonal Goods (%) | Opportunity Index |
|---|---|---|---|---|---|---|---|
| 101 | PRS | 1854 | 41.5 | 14,518,770 | 21.4 | 2.1 | 54.2 |
| 110 | MNO | 1678 | 31.3 | 12,254,987 | 34.0 | 1.2 | 43.9 |
| 111 | TUV | 1733 | 47.6 | 9,443,291 | 24.3 | 1.8 | 36.0 |
| 115 | AAB | 1299 | 38.2 | 6,188,323 | 32.1 | 1.3 | 44.7 |
| 117 | BBC | 758 | 29.8 | 3,497,222 | 18.3 | 4.1 | 10.3 |

FIG. 4G

OPPORTUNITY ANALYSIS FOR [ SELECT SEASON ▶ ] — 410

Download ▼ — 415
Sort ▼ — 420

STORES

| ID | Name | Size | Revenue ($) | Seasonal Goods (%) | Opportunity Index |
|---|---|---|---|---|---|
| 0001 | ABC Store 1 | Large | 46,328K | 0 | 5.6 |
| 0002 | DEF Store 1 | Small | 2,843K | 1.2 | 1.7 |
| 0003 | GHI Store 1 | Large | 37,904K | 5.4 | 0.3 |
| 0007 | DEF Store 2 | Small | 2,122K | 0.8 | 1.9 |
| 0010 | JKL Store 4 | Medium | 13,956K | 3.3 | 0.8 |

MISALIGNMENT DETECTION SYSTEM FOR EFFICIENTLY PROCESSING DATABASE-STORED DATA AND AUTOMATICALLY GENERATING MISALIGNMENT INFORMATION FOR DISPLAY IN INTERACTIVE USER INTERFACES

CROSS-REFERENCE TO RELATED APPLICATIONS

This application is a continuation of U.S. patent application Ser. No. 15/167,856, entitled "MISALIGNMENT DETECTION SYSTEM FOR EFFICIENTLY PROCESSING DATABASE-STORED DATA AND AUTOMATICALLY GENERATING MISALIGNMENT INFORMATION FOR DISPLAY IN INTERACTIVE USER INTERFACES" and filed on May 27, 2016, which claims priority under 35 U.S.C. § 119(e) to U.S. Provisional Application No. 62/269,612, entitled "MISALIGNMENT DETECTION SYSTEM FOR EFFICIENTLY PROCESSING DATABASE-STORED DATA AND AUTOMATICALLY GENERATING MISALIGNMENT INFORMATION FOR DISPLAY IN INTERACTIVE USER INTERFACES" and filed on Dec. 18, 2015, which are hereby incorporated by reference herein in their entireties.

TECHNICAL FIELD

The present disclosure relates to systems and techniques for integrating and processing database-stored data for identifying geographic clusters of information and displaying such data in interactive user interfaces.

BACKGROUND

Generally, distributors receive shipments of items and are tasked with routing the items to multiple warehouses. In turn, each warehouse is tasked with routing the items to an appropriate set of entities that offer the items to users. The number of entities that offer items to users can number in the tens of thousands to the hundreds of thousands, and so ensuring that shipments are routed to the correct locations can be very complicated. Thus, the distributors, the warehouses, and the entities that offer items to users may utilize a complex and detailed shipment routing system.

Often, different entities manage data that can be useful in analyzing the shipment of items via the shipment routing system. Thus, such data may be stored in multiple, and often incompatible, databases. Given the disparate sources of data, it can be difficult for a user to gather such data and view the information in a user interface.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for integrating data from disparate sources to identify shipment misalignments and displaying such information in interactive user interfaces. For example, the systems described herein can define various geographic regions using location and census data and identify the defined geographic regions in which stores are located. Using shipment data and micro-market data, the systems described herein can then identify the geographic regions that items are shipped to, identify the demand for such items in the geographic regions, and determine whether the quantity of items shipped to the geographic regions is appropriate based on the demand. Such information can be displayed in an interactive user interface that allows a user to view the geographic clustering of item demand, identify potential opportunities for correcting shipment misalignment, and/or correct identified shipment misalignments.

One aspect of the disclosure provides a computer-implemented method of accessing one or more databases in order to determine information related to the routing of an item and providing the determined information to a user in an interactive user interface. The computer-implemented method comprises: retrieving geographic data associated with a plurality of first geographic regions from a first database in the one or more databases; for each first geographic region, determining a first location representing a center of the respective first geographic region based on the retrieved geographic data; retrieving population data associated with a plurality of second geographic regions from a second database in the one or more databases; for each first geographic region, identifying one or more second geographic regions within a first distance of the center of the respective first geographic region based on the population data, and modifying the respective first geographic region to be a shape of the identified one or more second geographic regions and at a set of geographic locations defined by the identified one or more second geographic regions; generating user interface data for rendering the interactive user interface on a computing device, the interactive user interface including graphical representations of the plurality of first geographic regions; receiving a selection of a first graphical representation of one first geographic region in the plurality of first geographic regions; and modifying the user interface data such that the interactive user interface displays shipment misalignment data associated with the one first geographic region represented by the first graphical representation.

The computer-implemented method of the preceding paragraph can have any sub-combination of the following features: where the geographic data comprises a list of cities and a list of states; where determining, for each first geographic region, a first location representing a center of the respective first geographic region further comprises, for each first geographic region: generating combinations of cities and states using the list of cities and the list of states, selecting a first set of combinations of cities and states from the generated combinations of cities and states, calculating an average based on a geographic location of each combination of city and state in the first set, and determining the first location based on a location associated with the calculated average; where the plurality of second geographic regions correspond to a plurality of census tracts, and where the population data comprises at least one of a size or location of each census tract in the plurality of census tracts; where identifying one or more second geographic regions within a first distance of the center further comprises identifying one or more census tracts associated with a geographic location that is within the first distance of the first location; where the graphical representations of the plurality of the first geographic regions are each shaded a color corresponding to a demand for the item in the respective first geographic region; where a first category of items is a subcategory of a second category of items, and where the method further comprises: determining, for the one first geographic region, a first percentage of sales of the second category of items that are sales of the first category of items using micro-market data stored in a third database in the one or more databases, determining, for the one first geographic region, a second percentage of shipments of the second category of items to the one first geographic region that are shipments of the first category of items using shipment data stored in a fourth database in the one or more databases, and generating an opportunity score that indicates shipment misalignment has occurred in response to a determination that the first percentage is greater than the second percentage; where the displayed shipment misalignment data comprises the opportunity score; where a third category of items is a second subcategory of the second category of items, and where the method further comprises: receiving a selection of the third category of items, determining, for the one first geographic region, a third percentage of sales of the second category of items that are sales of the third category of items using the micro-market data, determining, for the one first geographic region, a fourth percentage of shipments of the second category of items to the one first geographic region that are shipments of the third category of items using the shipment data, generating a second opportunity score that indicates shipment misalignment has occurred in response to a determination that the third percentage is greater than the fourth percentage, and modifying the user interface data such that the shipment misalignment data comprises the second opportunity score; where the method further comprises retrieving shipment data associated with the one first geographic region from a third database in the one or more databases, where the shipment data comprises an amount of the item shipped to the one first geographic region; and where the method further comprises modifying the user interface data such that the interactive user interface includes a selectable option to ship additional items to the one first geographic region in response to a determination that the amount of the item shipped to the one first geographic region does not exceed a threshold value.

Another aspect of the disclosure provides a computer-implemented method for routing an item to a geographic location. The computer-implemented method comprises: retrieving geographic data associated with a plurality of first geographic regions; for each first geographic region, determining a first location representing a center of the first geographic region based on the retrieved geographic data; retrieving population data associated with a plurality of second geographic regions; for each first geographic region, identifying one or more second geographic regions within a first distance of the center of the respective first geographic region based on the population data, and modifying the respective first geographic region to be a shape of the identified one or more second geographic regions and at a set of geographic locations defined by the identified one or more second geographic regions; determining a representation of a geographic location of an entity; identifying one first geographic region in the plurality of first geographic regions associated with the determined representation; retrieving shipment data associated with the entity, where the shipment data comprises an amount of the item shipped to the entity; and generating an instruction to ship additional items to the entity in response to a determination that the amount of the item shipped to the entity does not exceed a threshold value.

The computer-implemented method of the preceding paragraph can have any sub-combination of the following features: where the method further comprises retrieving item data from a third database in the one or more databases, where the item data indicates a likelihood that the item is procured in individual first geographic regions; and where the method further comprises generating user interface data for rendering an interactive user interface on a computing device, the interactive user interface including graphical representations of the plurality of first geographic regions, where the graphical representations are shaded based on the retrieved item data.

Accordingly, in various embodiments, large amounts of data are automatically and dynamically calculated interactively in response to user inputs, and the calculated data is efficiently and compactly presented to a user by the systems disclosed herein. Thus, in some embodiments, the user interfaces described herein are more efficient as compared to previous user interfaces in which data is not dynamically updated and compactly and efficiently presented to the user in response to interactive inputs.

Further, as described herein, the systems disclosed herein may be configured and/or designed to generate user interface data useable for rendering the various interactive user interfaces described. The user interface data may be used by the systems disclosed herein, and/or another computer system, device, and/or software program (e.g., a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described herein, existing technology for viewing the clustering of item demand by geographic region (including, e.g., electronic mapping systems) is limited in various ways (e.g., data is missing because data is stored and managed by different entities, image rendering is slow and cumbersome, comparison of geographic regions is inefficient, etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related shipment, census, location, and/or micro-market data to determine item demand and/or shipment misalignment in various geographic regions, and presentation of the updates to the determined item demand and/or shipment misalignment in the various geographic regions via interactive graphical user interfaces. Such features and others (e.g., the generation and display of shipment geographic regions, the determination of which shipment geographic region a store is located within, etc.) are intimately tied to, and enabled by, computer technology, and would not exist except for computer technology. For example, the interactions with displayed data described below in reference to various embodiments (e.g., the selection of various distributors or warehouses to view additional information, the selection of various shipment geographic regions to view locations of stores, warehouses, and/or distributors and shipment misalignment information, etc.) cannot reasonably be performed by humans alone, without the computer technology upon which they are implemented. Further, the implementation of the various embodiments of the present disclosure via computer technology enables many of the advantages described herein, including more efficient generation of, interaction with, and presentation of, shipment misalignment information.

BRIEF DESCRIPTION OF THE DRAWINGS

FIGS. 4A-4I illustrate a user interface displaying the geographic clustering of item demand and opportunities for identifying and/or correcting shipment misalignment.

DETAILED DESCRIPTION OF SPECIFIC EMBODIMENTS

Overview

Figure 1:
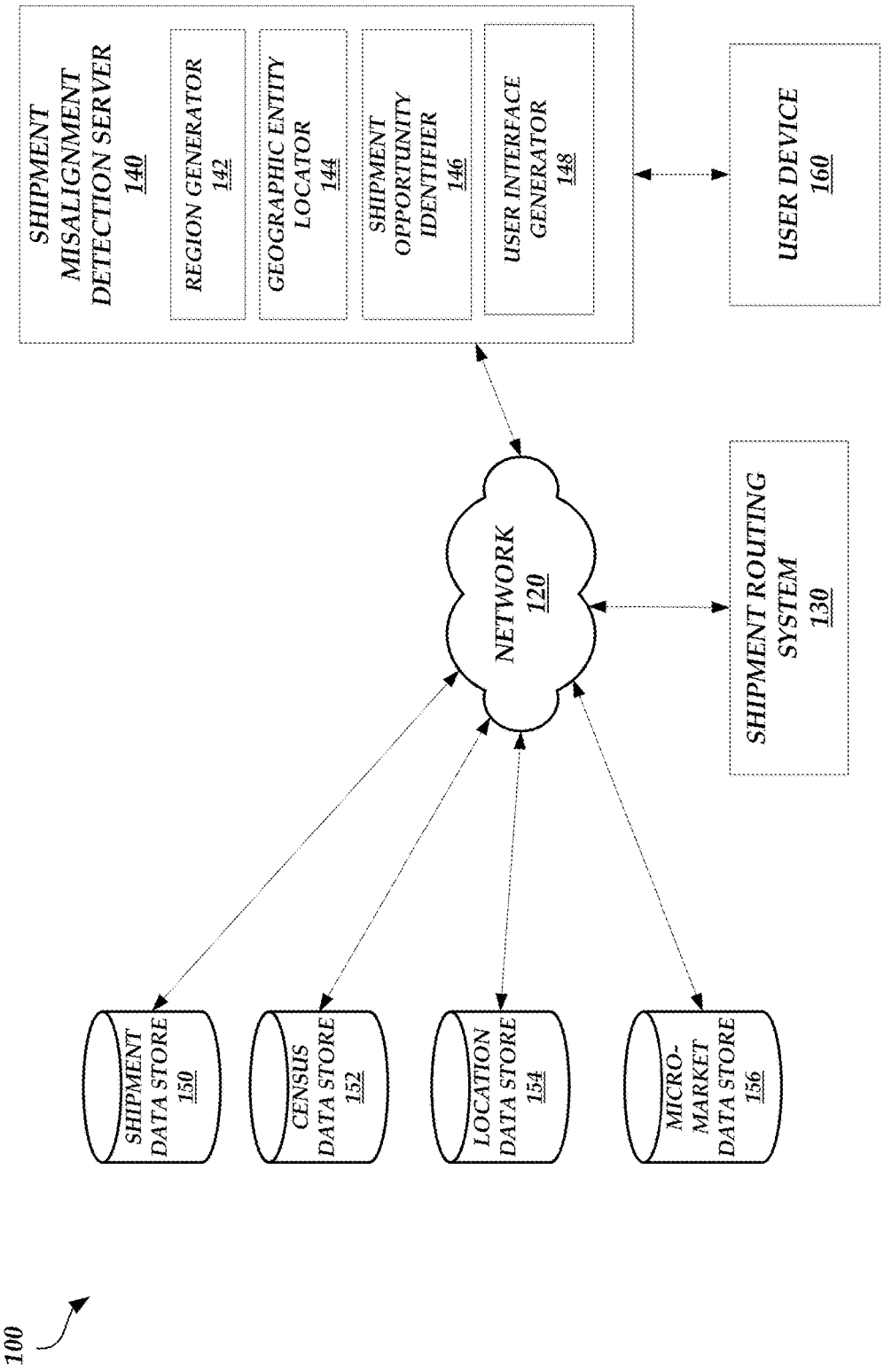
FIG. 1 illustrates a block diagram showing the various components of a shipment misalignment detection system.

Generally, consumer packaged goods companies (e.g., food and beverage companies) do not control the sale of items directly to users. Rather, consumer packaged goods companies handle the marketing and distribution to retailers (e.g., department stores, grocery stores, drug stores, mass merchandiser stores, dollar stores, supercenters, club stores, commissaries, convenience stores, etc.) and the retailers offer items directly to users. Thus, consumer packaged goods companies often rely on retailers to drive revenue. Accordingly, it may be very important for such consumer packaged goods companies to not only ensure that shipments arrive at a chosen location (e.g., via a shipment routing system), but also to determine whether a shipment should even be sent to a particular location in the first place.

For example, certain items may be popular in some geographic locations and not popular in other geographic locations. However, while a certain item may be popular in a particular geographic location, stores located in the particular geographic location may not be receiving a sufficient quantity of the items or any at all. Thus, there may be an opportunity for consumer packaged goods companies to increase revenue by analyzing item demand and routing a larger quantity of items to one geographic location and/or routing a smaller quantity of items to another geographic location. This potential mismatch between a quantity of items that represents the demand for the item in a geographic location and the actual quantity of the items shipped to a store in the geographic location is referred to herein as "shipment misalignment."

However, as referenced above, different entities may manage data that can be useful in determining whether an appropriate quantity of items is being routed to any given geographic location. For example, shipment data (e.g., the quantity of items shipped by distributors to various stores via warehouses), location data (e.g., data defining the different geographic regions in which stores are located), census data (e.g., population data, the size and location of census tracts (e.g., statistical subdivisions of a county or equivalent entity), etc.), and/or micro-market data (e.g., point of sale (POS) data identifying the sales of items by retailers in various geographic regions) can, in aggregate, be useful in determining whether there is shipment misalignment in one or more geographic regions. This data, though, may originate from disparate sources. Shipment data may be collected and stored in databases operated by the distributors, location data may be generated by private entities using information about stores (e.g., the geographic location of a store, the type of store, etc.), census data may be tabulated by the government, and micro-market data may be generated by private entities based on sales data received from retailers in various channels (e.g., food/grocery, drug, mass merchandiser, supercenter, club, dollar, commissary, convenience, etc.). Because the data is not cohesive and integrated, it can be difficult to construct a system that can visualize the clustering of item demand by geographic region and/or shipment misalignment in, for example, a single interactive user interface.

In fact, additional issues may hamper the visualization of such information in a single interactive user interface. For example, the micro-market data may be incomplete. The micro-market data may include information detailing the sales of items in some channels (e.g., food/grocery, drug, mass merchandiser, supercenter, club, dollar, and commissary, which can be defined collectively as eXtended All Outlet Combined (xAOC) or MULti Outlet (MULO)), but not in other channels (e.g., convenience). Data from convenience stores may be missing, for example, because many convenience stores may be individually owned and it would require great effort to identify and reach out to each of these stores to obtain sales data. Grocery stores, drug stores, and the like, on the other hand, may be part of larger corporate entities and thus it may be easier to obtain sales data. Even if the data was integrated, the incomplete micro-market data could make the display of accurate information a challenging endeavor to overcome.

Accordingly, disclosed herein are various systems and methods for integrating data from disparate sources to identify shipment misalignments and displaying such information in interactive user interfaces. For example, a shipment misalignment detection server can define various geographic regions using location and census data and identify the defined geographic regions in which stores are located. Using shipment data and micro-market data, the shipment misalignment detection server can then identify the geographic regions that items are shipped to, identify the demand for such items in the geographic regions, and determine whether the quantity of items shipped to the geographic regions is appropriate based on the demand. The shipment misalignment detection server can generate an interactive user interface for displaying such information, where the interactive user interface allows a user to view the geographic clustering of item demand, identify potential opportunities for correcting shipment misalignment, and/or correct identified shipment misalignments.

In an embodiment, the shipment misalignment detection server can function as described herein even if the micro-market data is incomplete. For example, while the demand for a certain item can vary across markets and regions, the demand for a certain item is generally consistent across channels in the same market or region. Thus, if the micro-market data includes information provided by xAOC stores and not convenience stores, this information nonetheless can be linked to and associated with convenience stores. Accordingly, if the shipment misalignment detection server is directed by a user to specifically analyze shipments to convenience stores, the shipment misalignment detection server can still use the micro-market data to complete the analysis.

Exemplary System Overview

FIG. 1 illustrates a block diagram showing the various components of a shipment misalignment detection system 100. As illustrated in FIG. 1, the shipment misalignment detection system 100 may include a shipment routing system 130, a shipment misalignment detection server 140, a shipment data store 150, a census data store 152, a location data store 154, a micro-market data store 156, and a user device 160. References herein to "data store" may refer to any type of data structure for storing and/or organizing data, including, but not limited to, relational databases (for example, Oracle database, mySQL database, and the like), spreadsheets, XML files, and text files, among others. The various terms "database," "data store," and "data source" may be used interchangeably in the present disclosure. A "file system" may control how data is stored and/or retrieved (for example, a disk file system like FAT, NTFS, optical discs, etc., a flash file system, a tape file system, a database file system, a transactional file system, a network file system, etc.). For simplicity, the disclosure is described herein with respect to data stores. However, the systems and techniques disclosed herein may be implemented with file systems or a combination of data stores and file systems.

In an embodiment, the shipment routing system 130, the shipment misalignment detection server 140, the shipment data store 150, the census data store 152, the location data store 154, and the micro-market data store 156 communicate via a network 120. In other embodiments, the functionality of the shipment routing system 130 and the shipment misalignment detection server 140 may be combined into a single computing system, such as a server or series of servers. Similarly, the functionality is disclosed with reference to these components may be distributed to other computing devices and/or partially performed by multiple computing devices.

The shipment data store 150 is configured to store shipment data for a plurality of distributors. The shipment data can include the quantity of shipped items and the locations to where the items are shipped (e.g., the physical addresses of warehouses and/or stores that receive shipments). The shipment data store 150 can include multiple entries for each distributor. For example, each entry may be associated with a different type of item shipped by the respective distributor. The shipment data store 150 can be managed by one or more distributors. While a single shipment data store 150 is illustrated in FIG. 1, this is not meant to be limiting. The shipment misalignment detection system 100 can include a plurality of shipment data stores 150, each managed by one or more distributors.

The census data store 152 is configured to store census data for a large geographic region (e.g., a state, a province, a country, etc.). The census data can include population data (e.g., a count of the number of persons living in the large geographic region or in one or more sub-regions), the size and location of census tracts (e.g., statistical subdivisions of a county or equivalent entity), and/or the like. The census data store 152 can be managed by a government agency (e.g., the U.S. Census Bureau).

The location data store 154 is configured to store location data for one or more geographic regions (e.g., zones in which stores are present) within a large geographic region. The location data can include information on zones. For example, the location data can include, for each zone, a list of cities and states (e.g., a list of 4 cities and a list of 4 states, resulting in 16 possible combinations of cities and states) that define the respective zone. In some embodiments, a zone is defined by the number and/or variety of types of stores located within the zone. For example, zones may each include a similar number and/or variety of types of stores. The location data store 154 can be managed by one or more private entities. While a single location data store 154 is illustrated in FIG. 1, this is not meant to be limiting. The shipment misalignment detection system 100 can include a plurality of location data stores 154, each managed by one or more private entities.

The micro-market data store 156 is configured to store micro-market data for one or more geographic regions. The micro-market data can include POS data identifying the sales of items by retailers in one or more channels (e.g., food/grocery, drug, mass merchandiser, supercenter, club, dollar, commissary, convenience, etc.) in one or more zones. The micro-market data store 156 can be managed by one or more private entities. While a micro-market data store 156 is illustrated in FIG. 1, this is not meant to be limiting. The shipment misalignment detection system 100 can include a plurality of micro-market data stores 156, each managed by one or more private entities.

The shipment routing system 130 can be a system that controls the distribution of items. For example, the shipment routing system 130 can instruct a distributor to ship an item to a certain warehouse linked to the distributor. Likewise, the shipment routing system 130 can instruct a warehouse to ship an item to a certain store linked to the warehouse. The shipment routing system 130 can receive instructions from the shipment misalignment server 140 to instruct distributors and/or warehouses to ship items to, for example, correct shipment misalignments.

The shipment misalignment detection server 140 may include various modules. For example, the shipment misalignment detection server 140 may include a region generator 142, a geographic entity locator 144, a shipment opportunity identifier 146, and a user interface generator 148. In an embodiment, the region generator 142, the geographic entity locator 144, the shipment opportunity identifier 146, and the user interface generator 148 are each implemented as executable code modules that are stored in the memory of, and executed by the processor(s) of, the shipment misalignment detection server 140. The region generator 142, the geographic entity locator 144, the shipment opportunity identifier 146, and the user interface generator 148 may also be implemented partly or wholly in application-specific hardware.

The region generator 142 may define one or more shipment geographic regions using the location data stored in the location data store 154 and the census data stored in the census data store 152. For example, each shipment geographic region can correspond to a different zone. The region generator 142 can first identify a center location of a shipment geographic region using the location data of the corresponding zone. As described above, the location data can include a list of cities and a list of states for each zone. Using this data for the corresponding zone, the region generator 142 can generate a list of every combination of cities and states from the two lists. Some combinations of cities and states may not be accurate (e.g., the city does not exist in the state) or may be an unlikely combination (e.g., the location of the city and state combination may be a long distance from the locations of the other city and state combinations). Thus, the region generator 142 can rank the combinations of cities and states by accuracy and/or likely combination and drop the lower ranked combinations (e.g., the bottom 12 or 13 combinations). Of the remaining combinations, the region generator 142 can take an average of the geographic locations of the city and state combinations (e.g., take an average of the geographic coordinates of the city and state combinations) and define the average as the location of the center of the shipment geographic region. The region generator 142 can repeat this process for every shipment geographic region to define the center of each shipment geographic region.

As described above, the census data can include the size and location of census tracts. Using the size and/or location information, the region generator 142 can identify one or more census tracts that are located within a vicinity of the center of a first shipment geographic region (e.g., an edge of a census tract is within a threshold distance of the center of the first shipment geographic region). Some or all of the census tracts that are within the vicinity of the center of the first shipment geographic region can be combined by the region generator 142 to form the size, shape, and location of the first shipment geographic region. The region generator 142 can repeat this process for every other shipment geographic region to define the size, shape, and location of the other shipment geographic regions. As described below in greater detail with respect to FIGS. 2A and 2B, the size, shape, and location of each shipment geographic region can be represented by a list, table, vector, and/or matrix of geographic coordinates (e.g., combinations of latitude and longitude coordinates). Information on the size, shape, and location of the shipment geographic regions can be provided by the region generator 142 to the user interface generator 148 for display in an interactive user interface.

The geographic entity locator 144 may use the defined shipment geographic regions to identify the stores and/or warehouses that are located within each defined shipment geographic region. For example, the geographic entity locator 144 can use the shipment data from the shipment data store 150 to generate geohashes for each store and/or warehouse (e.g., convert the physical addresses of stores and/or warehouses that receive shipments into geographic coordinates, such as latitude and longitude). The geographic entity locator 144 can then compare the geographic coordinates of a store or warehouse with the representations of the size, shape, and location of various shipment geographic regions to identify the shipment geographic region a store or warehouse is located within. The process by which the geographic entity locator 144 performs the comparison is described in greater detail below with respect to FIG. 3. Information on the locations of stores and/or warehouses within the various shipment geographic regions can be provided by the geographic entity locator 144 to the user interface generator 148 for display in the interactive user interface.

Once the locations of stores and/or warehouses within shipment geographic regions have been identified, the shipment opportunity identifier 146 can determine in which shipment geographic regions shipment misalignment may be present. For example, the shipment opportunity identifier 146 may be directed (e.g., by a user) to analyze a specific subcategory of items, such as items (e.g., fruits, shoes, candy, etc.) associated with a specific or seasonal time of the year (e.g., Valentine's Day, Easter, Independence Day, Halloween, Thanksgiving, Christmas, etc.). The shipment opportunity identifier 146 can use micro-market data from the micro-market data store 156 to identify POS data for the specific subcategory of items within the zones. Because the zones correspond to the shipment geographic regions, the shipment opportunity identifier 146 can associate the POS data with the shipment geographic regions. Thus, the shipment opportunity identifier 146 has identified the POS data for the specific subcategory of items within the shipment geographic regions.

To determine the demand for the specific subcategory of items within the shipment geographic regions, the shipment opportunity identifier 146 can use the POS data to calculate, for each shipment geographic region, the percentage of sales of a category of items that are sales of the specific subcategory of items. For example, if the subcategory of items is Halloween candy, then the shipment opportunity identifier 146 may calculate the percentage of all candy sales within a first shipment geographic region that are Halloween candy sales. The shipment opportunity identifier 146 may repeat this calculation for some or all shipment geographic regions. In an embodiment, the calculation is restricted to a specific time period (e.g., provided by a user via the interactive user interface).

The shipment opportunity identifier 146 can rank and/or group the percentages associated with the different shipment geographic regions to identify shipment geographic regions in which the specific subcategory of items is popular and regions in which the specific subcategory of items is not popular. Such information can be provided by the shipment opportunity identifier 146 to the user interface generator 148 for display in the interactive user interface.

In a further embodiment, the shipment opportunity identifier 146 generates an opportunity score or index associated with some or all stores, warehouses, and/or distributors in the shipment geographic regions. The opportunity score can be a numerical value that represents the degree of shipment misalignment and the amount of opportunity available for correcting such shipment misalignment. For example, the shipment opportunity identifier 146 can compare the popularity of the specific subcategory of items in a shipment geographic region with the actual quantity of these specific subcategory of items shipped to stores in the shipment geographic region (as identified by the shipment data). As described above, the popularity or demand for a subcategory of an item can be represented as a first percentage (e.g., the percentage of the sales of a category of an item that are sales of the subcategory of the item). The shipment opportunity identifier 146 can calculate a second percentage: the percentage of the shipments of a category of an item to a store (or warehouse or distributor) that include the subcategory of the item. If the first percentage is greater than the second percentage, then the shipment opportunity identifier 146 can determine that the store (or warehouse or distributor) is underserved (e.g., a larger quantity of the subcategory of the item should be shipped to the location to meet demand) and can assign the store (or warehouse or distributor) a higher opportunity score (where the score is higher the greater the difference between the percentages). Likewise, if the first percentage is less than or equal to the second percentage, then the shipment opportunity identifier 146 can determine that the store (or warehouse or distributor) is overserved or properly served and can assign the store (or warehouse or distributor) a lower opportunity score. The opportunity scores can be provided by the opportunity identifier 146 to the user interface generator 148 for display in the interactive user interface.

In still further embodiments, the shipment opportunity identifier 146 can generate instructions (e.g., at the request of the user) for correcting any shipment misalignment and transmit such instructions to the shipment routing system 130. The shipment routing system 130 can then adjust the shipment of items to distributors, warehouses, and/or stores accordingly.

The user interface generator 148 may generate an interactive user interface that displays the information provided by the region generator 142, the geographic entity locator 144, and/or the shipment opportunity identifier 146. For example, the user interface generator 146 may generate one or more tables that include store, warehouse, and/or distributor information (e.g., sales information, shipments of specific subcategories of items, opportunity scores, etc.), an interactive map that displays shipment geographic regions, the stores, warehouses, and/or distributors located in the shipment geographic regions, and a comparison of the demand for items in different shipment geographic regions (e.g., the clustering of item demand by geographic region). The contents of the interactive user interface are described in greater detail below with respect to FIGS. 4A through 4I.

The shipment misalignment detection server 140 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the shipment misalignment detection server 140 may be implemented in a Java Virtual Machine (JVM) that is executing in a distributed or non-distributed computer system. In other embodiments, the shipment misalignment detection server 140 may be implemented as a combination of programming instructions written in any programming language (e.g. C++, Visual Basic, Python, etc.) and hardware components (e.g., memory, CPU time) that have been allocated for executing the program instructions.

A user may use the user device 160 to view and interact with the interactive user interface generated by the user interface generator 148. For example, the user device 160 may be in communication with the shipment misalignment detection server 140 via a network (not shown). The user device 160 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 160 may execute a browser application to communicate with the shipment misalignment detection server 140.

In an embodiment, the network 120 includes any communications network, such as the Internet. The network 120 may be a wired network, a wireless network, or a combination of the two. For example, network 120 may be a local area network (LAN) and/or a wireless area network (WAN).

Example Shipment Geographic Region and Shape Definition

Figure 2A:
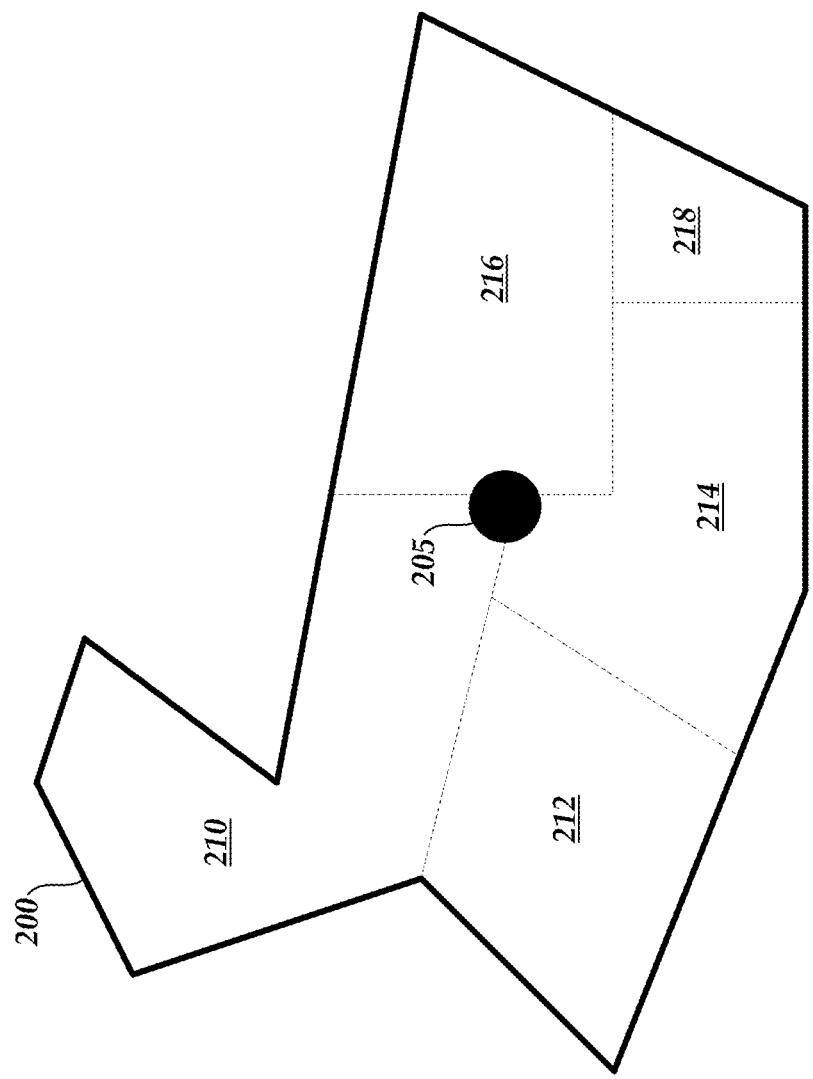
FIG. 2A illustrates an exemplary shipment geographic region.

FIG. 2A illustrates an exemplary shipment geographic region 200. As illustrated in FIG. 2A, the shipment geographic region 200 includes a center at location 205. As described above, the region generator 142 can determine the location 205 of the center of the shipment geographic region 200 using the location data.

Furthermore, as described above, the region generator 142 can use the census data, and specifically one or more census tracts, to define the size, shape, and location of the shipment geographic region 200. For example, the shipment geographic region 200 may comprise census tract 210, 212, 214, 216, and 218. As illustrated in FIG. 2A, census tracts 210, 214, and 216 overlap a portion of the center at location 205. While census tracts 212 and 218 do not overlap any portion of the center shipment geographic region 200 at location 205, the census tracts 212 and 218 may nonetheless be considered to have at least one edge within a vicinity of the center of the shipment geographic region 200 at location 205 (e.g., the edges of census tracts 212 and 218 closest to the location 205).

While the shipment geographic region 200 is illustrated as having 9 sides, this is not meant to be limiting. Shipment geographic regions can have any number of edges or sides and be any size or shape or be located in any location.

Like the shipment geographic region 200, many shipment geographic regions may not have a uniform or symmetrical shape. To properly define the geographic coordinates that form the boundary of a shipment geographic region, the region generator 142 can represent the shipment geographic region as a list, table, vector, and/or matrix of geographic coordinates (e.g., combinations of latitude and longitude coordinates).

Figure 2B:
FIG. 2B illustrates an exemplary list of geographic coordinates defining the shape of a shipment geographic region.

FIG. 2B illustrates an exemplary list of geographic coordinates defining the shape of a shipment geographic region, such as the shipment geographic region 200. As illustrated in FIG. 2B, list 250 includes rows of latitude and longitude coordinates that represent all the latitude and longitude coordinate combinations that fall within or define the boundary of the shipment geographic region. Each row in the list 250 begins with a latitude and is followed by a first longitude coordinate that represents the first longitude coordinate in a range of longitude coordinates associated with the latitude and a second longitude coordinate that represents the last longitude coordinate in the range of longitude coordinates. For example, the first entry in the first row in the list 250 is a latitude of 38.12242° N. The next entry in the first row in the list 250 is a longitude of 93.50187° W. This longitude coordinate represents the beginning of a range of longitude coordinates associated with the latitude that fall within or define the boundary of the shipment geographic region. As it turns out, only one longitude coordinate paired with the latitude coordinate falls within or defines the boundary of the shipment geographic region. Thus, the third entry in the first row in the list 250 is also the longitude of 93.50187° W.

The second row in the list 250, however, includes two different longitude coordinates. The first entry in the second row is a latitude of 38.12243° N, the second entry in the second row is a longitude of 93.50385° W, and the third entry in the second row is a longitude of 93.95109° W. Thus, if a store is located at a latitude of 38.12243° N and a longitude of 93.60000° W, the store falls within or along the boundary of the shipment geographic region according to the list 250.

The list 250 is merely for illustrative purposes and is not meant to be limiting. The latitude and longitude information can be organized by the region generator 142 in any manner to define the shipment geographic region. For example, the placement of the latitude and longitude coordinates could be flipped such that the first entry in a row is a longitude, the second entry in a row is a first latitude coordinate that represents the first latitude coordinate in a range of latitude coordinates associated with the longitude and a second latitude coordinate that represents the last latitude coordinate in the range of latitude coordinates.

Example Flow Diagram for Identifying the Location of a Store

Figure 3:
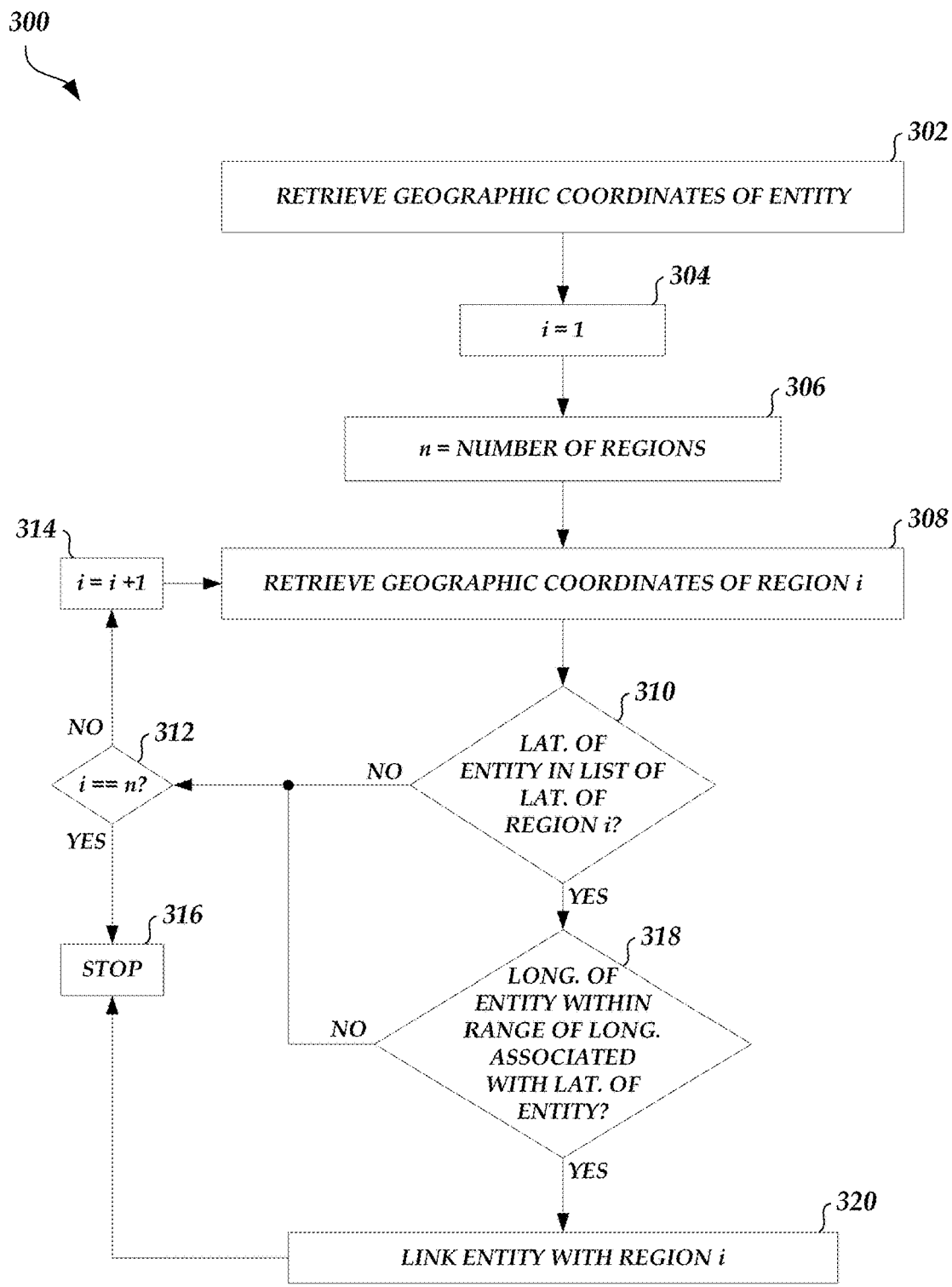
FIG. 3 illustrates a flow diagram depicting an illustrative operation for identifying which shipment geographic region a store is located within.

FIG. 3 illustrates a flow diagram depicting an illustrative operation 300 for identifying which shipment geographic region a store is located within. For example, the operation 300 can be performed by the shipment misalignment detection server 140 (e.g., the geographic entity locator 144).

The operation 300 begins at block 302, where geographic coordinates of an entity are retrieved. The entity can be a store, warehouse, or distributor. For example, the physical address of the entity can be retrieved from the shipment data store 150. The geographic entity locator 144 can then convert the physical address into geographic coordinates.

At block 304, variable i is set equal to 1. Variable i represents a shipment geographic region.

At block 306, variable n is set equal to the total number of shipment geographic regions (e.g., 500, 2000, etc.). The total number of shipment geographic regions may correspond to the number of zones.

At block 308, geographic coordinates of region i are retrieved. As described above with respect to FIG. 2B, the geographic coordinates of a region can be in the form of a list, table, vector, and/or matrix and can identify pairs and/or ranges of latitude and longitude coordinates.

At block 310, the operation 300 determines whether the latitude of the entity is listed in the geographic coordinates of region i. For example, the operation 300 determines whether the first entry of any of the rows in the list 250 includes the latitude of the entity. If the latitude of the entity is listed in the geographic coordinates of region i, then the operation 300 proceeds to block 318. Otherwise, the operation 300 proceeds to block 312.

At block 312, the operation 300 determines whether variable i is equal to variable n. In other words, the operation 300 determines whether all shipment geographic regions have been analyzed to determine in which shipment geographic region the entity is located. If variable i is not equal to variable n (e.g., not all shipment geographic regions have been analyzed), then the operation 300 proceeds to block 314. Otherwise, the operation 300 proceeds to block 316 and stops.

At block 314, variable i is incremented by one. The operation 300 then proceeds back to block 308 so that a new region i can be analyzed and blocks 310, 312, 314, and/or 318 can be repeated.

At block 318, the operation 300 determines whether the longitude of the entity is listed within the range of longitude coordinates of region i associated with the latitude of the entity. For example, the operation 300 determines whether the longitude of the entity falls within the range of longitude coordinates defined by the second entry and the third entry of the row in the list 250 that includes the latitude of the entity as the first entry. If the longitude of the entity falls within the range, then the operation 300 proceeds to block 320. Otherwise, the operation 300 proceeds to block 312.

At block 320, the entity is linked with region i. In other words, the geographic entity locator 144 has determined that the entity is located within or on the boundaries of the region i. The operation 300 then proceeds to block 316 and stops. In some embodiments, the operation 300 is repeated for some or all available entities.

Figure 4A:
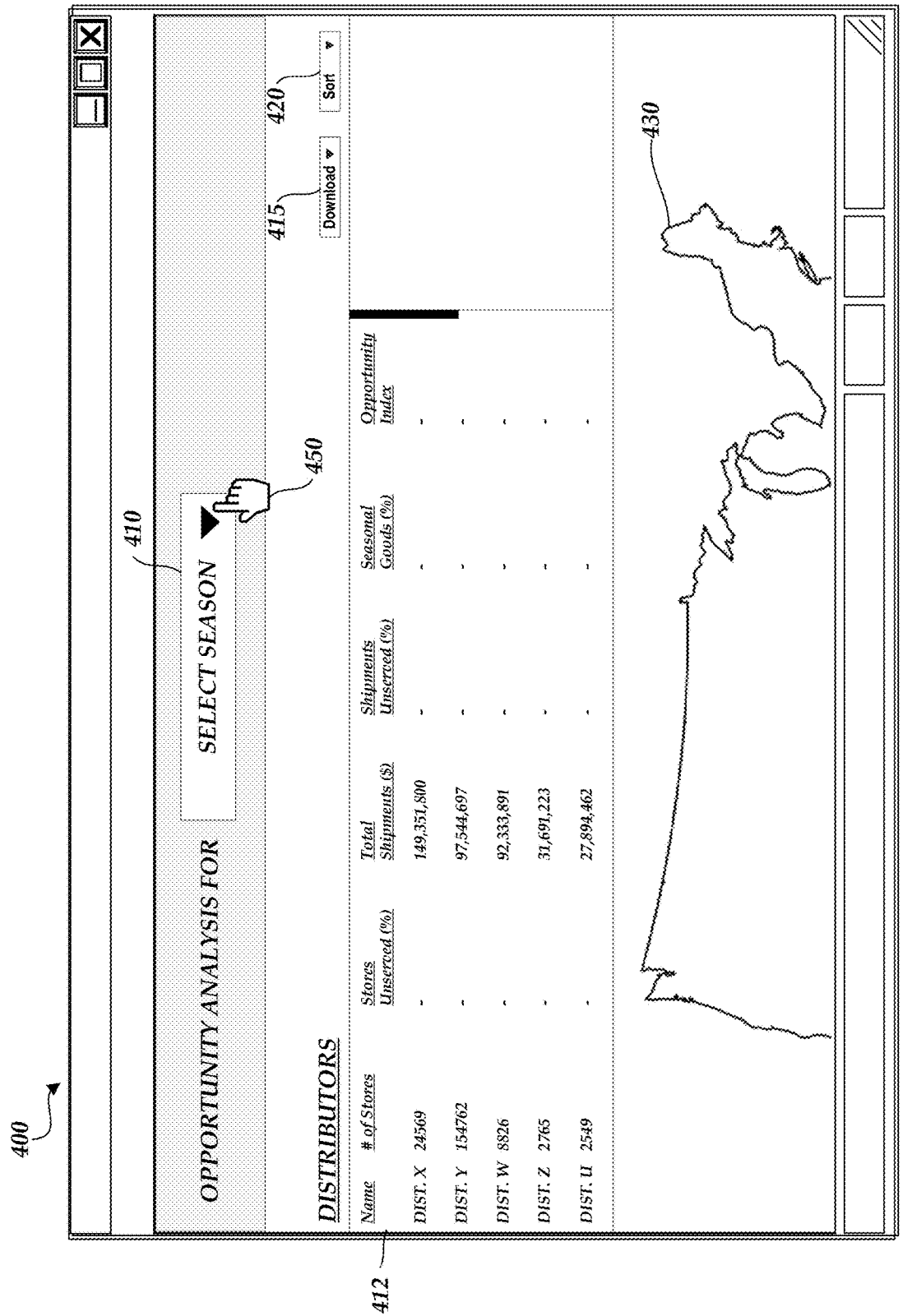

Examples of Shipment Misalignment Data Displayed in an Interactive User Interface FIGS. 4A-4I illustrate a user interface 400 displaying the geographic clustering of item demand and opportunities for identifying and/or correcting shipment misalignment. As illustrated in FIG. 4A, the user interface 400 includes a subcategory button 410, a table 412 of distributors, a download button 415, a sort button 420, and a map 430. As described above, a user can select a subcategory of an item to analyze. For example, the user can select the subcategory button 410 using a cursor 450 to select a subcategory.

Figure 4B:
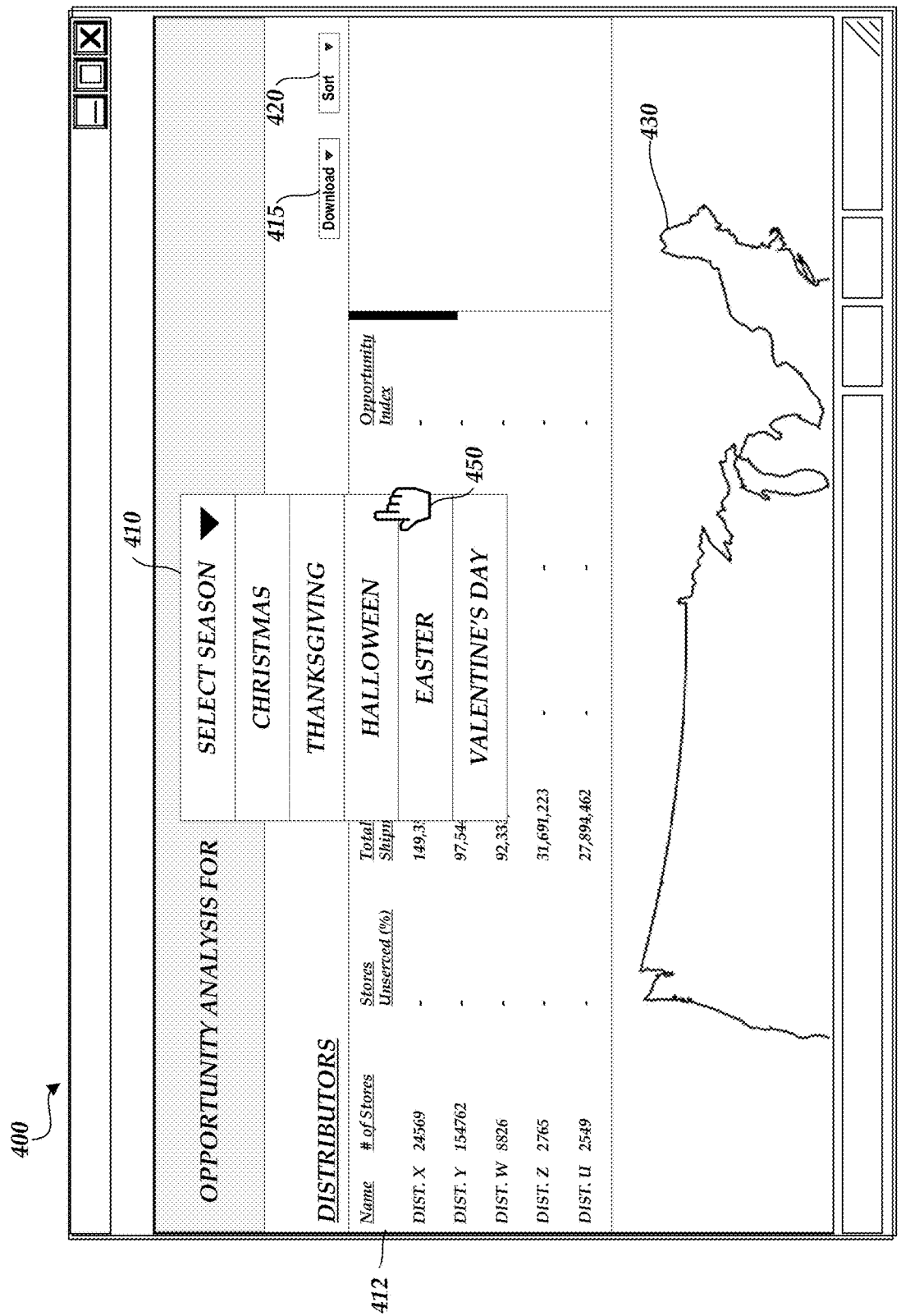

As illustrated in FIG. 4B, several options are provided in the user interface 400 after selecting the subcategory button 410, including Christmas, Thanksgiving, Halloween, Easter, and Valentine's Day. The list of subcategories may change depending on the item or category of items being analyzed. For example, the user interface 400 displays the analysis of food products, such as candy. However, if the user interface 400 instead displayed the analysis of shoes, the list of subcategories may instead include running, tennis, basketball, casual, dress, and/or the like.

Figure 4C:
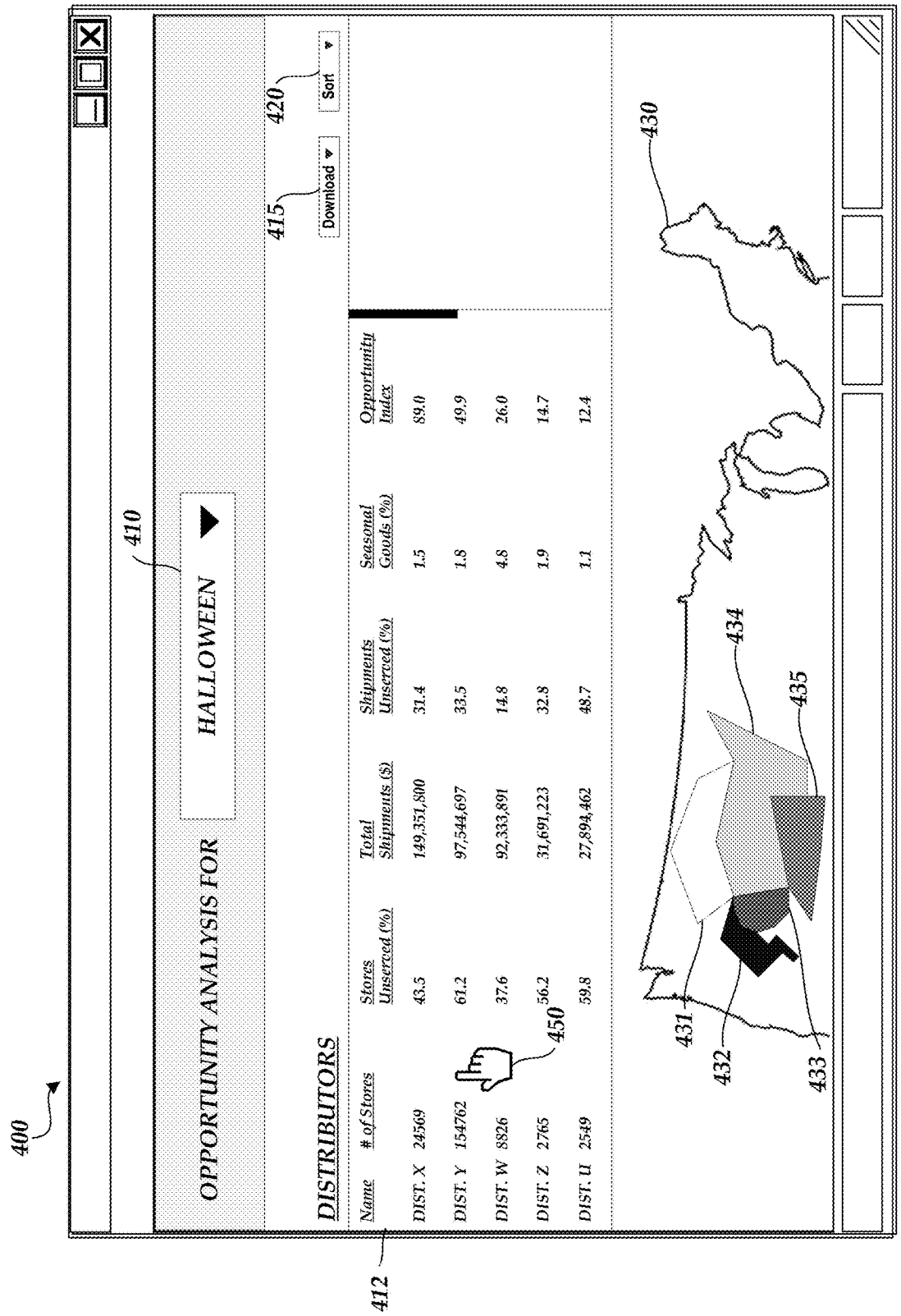

Selection of a subcategory (e.g., Halloween in this case) causes the user interface 400 to display various information for distributors listed in the table 412, as illustrated in FIG. 4C. For example, the table 412 lists distributor names, the number of stores associated with a distributor (e.g., the number of stores that eventually receive shipments of the item from the distributor), the percentage of unserved stores (e.g., the percentage of stores that do not receive the subcategory of the item), the total shipments made by the distributors (e.g., of all subcategories of the item), the percentage of unserved shipments (e.g., the percentage of shipments that do not include the subcategory of the item), the percentage of seasonal goods (e.g., the percentage of total sales of the item that are sales of the subcategory of the item), and the opportunity index (e.g., the opportunity score, where a higher score indicates a higher degree of shipment misalignment and/or a larger amount of opportunity available for correcting such shipment misalignment). Thus, the table 412 identifies the distributors that are associated with warehouses and/or stores in which there may be a high amount or low amount of shipment misalignment.

Furthermore selection of a subcategory causes the user interface 400 to display representations of shipment geographic regions 431-435 in the map 430. While FIG. 4C only depicts 5 shipment geographic regions 431-435, this is not meant to be limiting and is only for ease of illustration. The map 430 may display representations of any number of shipment geographic regions, such as, for example, the total number of shipment geographic regions in the large geographic region represented by the map 430. The shipment geographic regions 431-435 may be shaded or otherwise modified in appearance to indicate a demand for the subcategory of the item in the respective shipment geographic region 431-435, as explained in greater detail below with respect to FIG. 4E.

The download button 415, when selected, can be used to save locally a copy of the information displayed in the table 412. The sort button 420, when selected, can be used to sort the information displayed in the table 412 (e.g., alphabetically by distributor, by opportunity index, by total shipments, etc.).

Any of the distributors listed in the table 412 can be selected to view additional information. For example, if DIST. Y is selected using the cursor 450, the user interface 400 displays the opportunity size (e.g., the potential increase in revenue if additional items in the subcategory are shipped to warehouses and/or stores by the distributor, calculated based on the opportunity index), the current seasonal shipment (e.g., the amount of the items in the subcategory that are currently shipped), the number of stores unserved (e.g., the number of stores of the distributor multiplied by the percent of stores unserved), and the sales representative of DIST. Y in window 440, as illustrated in FIG. 4D.

Figure 4D:
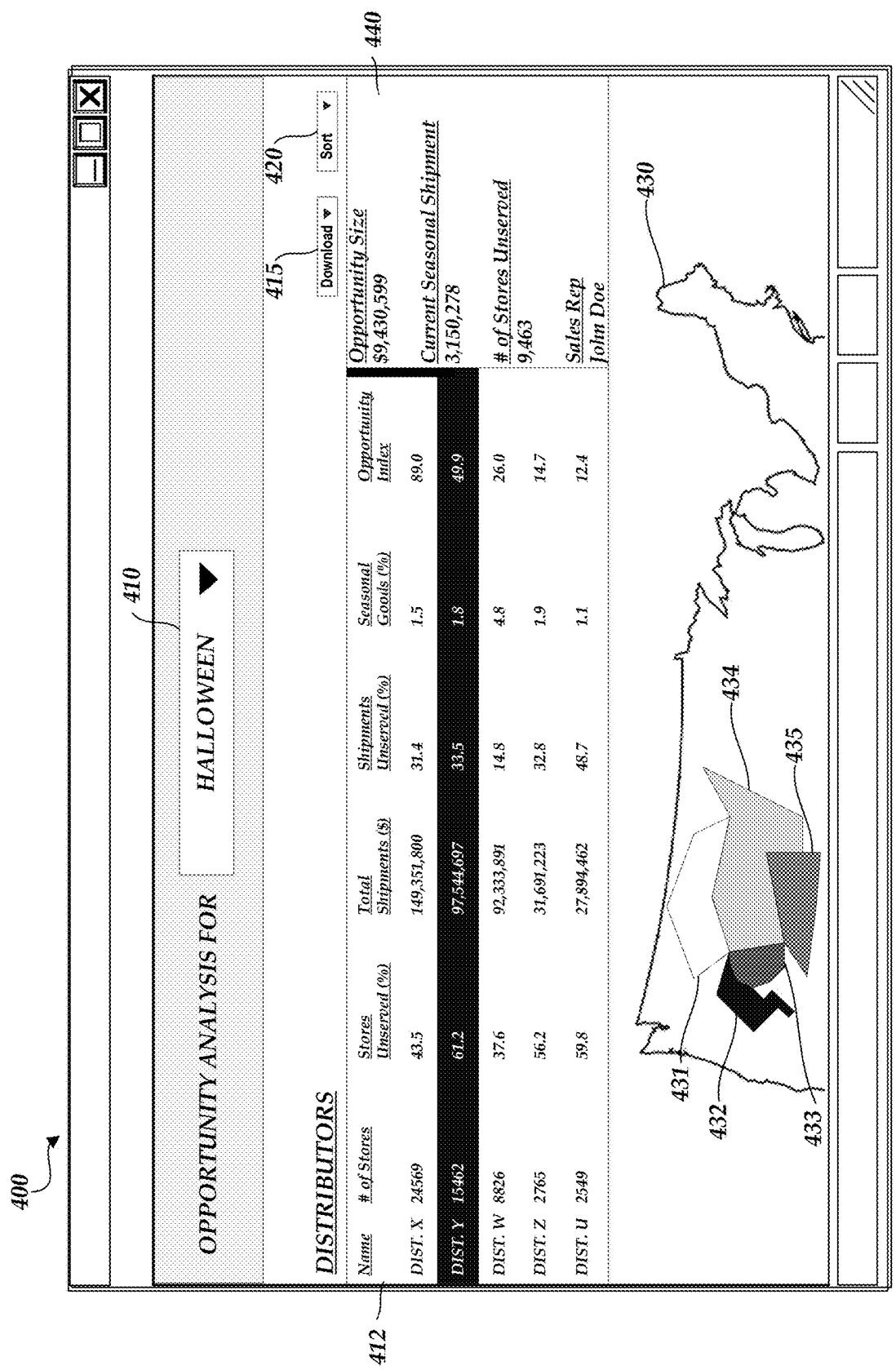
Figure 4E:
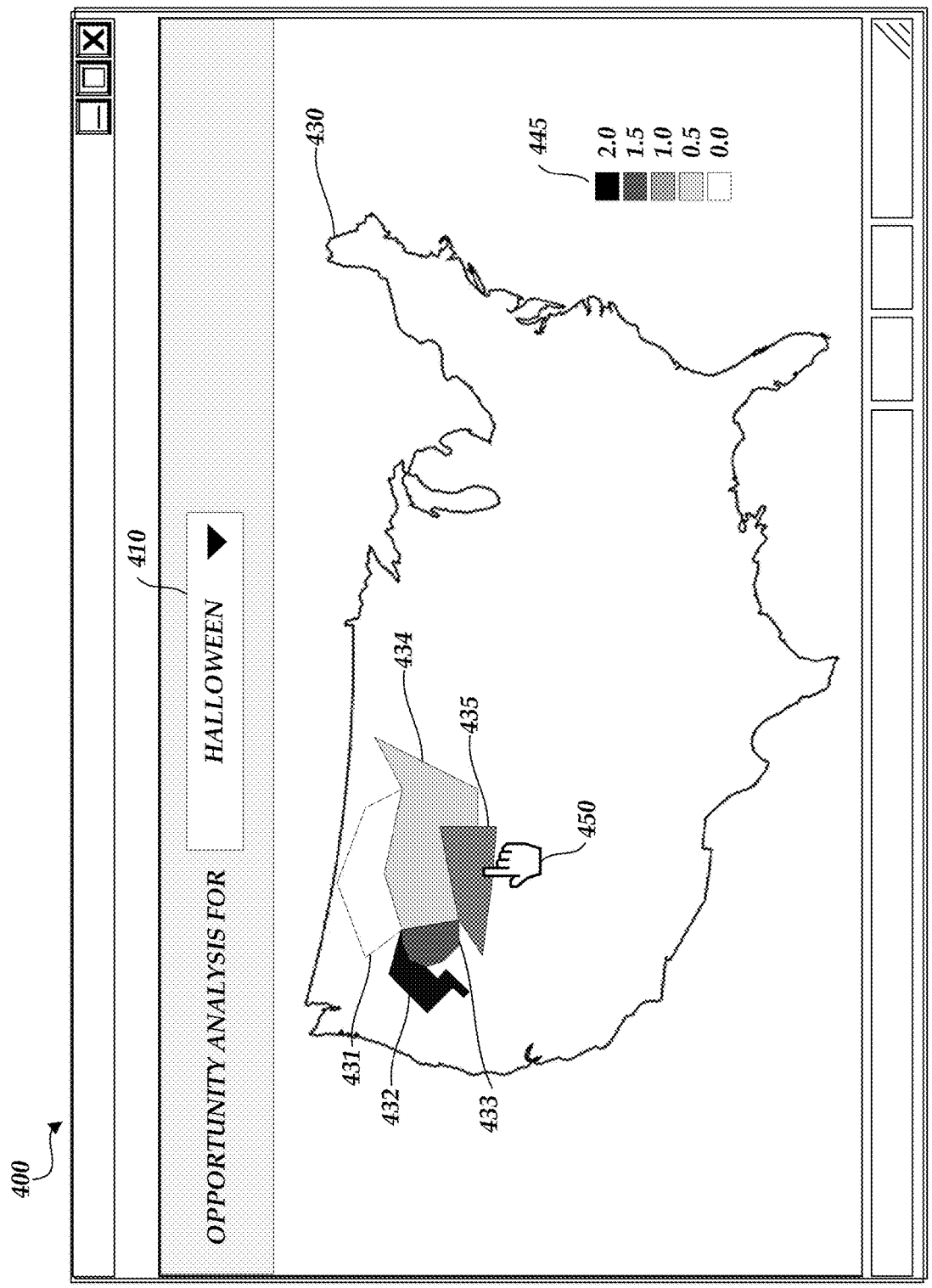

Furthermore, the user can scroll down from the table 412 to view the map 430 in greater detail, as illustrated in FIG. 4E. As described above, the representations of the shipment geographic regions 431-435 can be shaded to reflect the demand for the subcategory of the item. A darker shading can represent a higher demand and a lighter shading can represent a lower demand (or vice-versa), as indicated in legend 445 (where the values in the legend 445 represent the percentage of total sales of the item that are sales of items in the subcategory). Thus, the user interface 400 provides a visualization of the demand for the items in the subcategory across different shipment geographic regions at once.

Figure 4F:
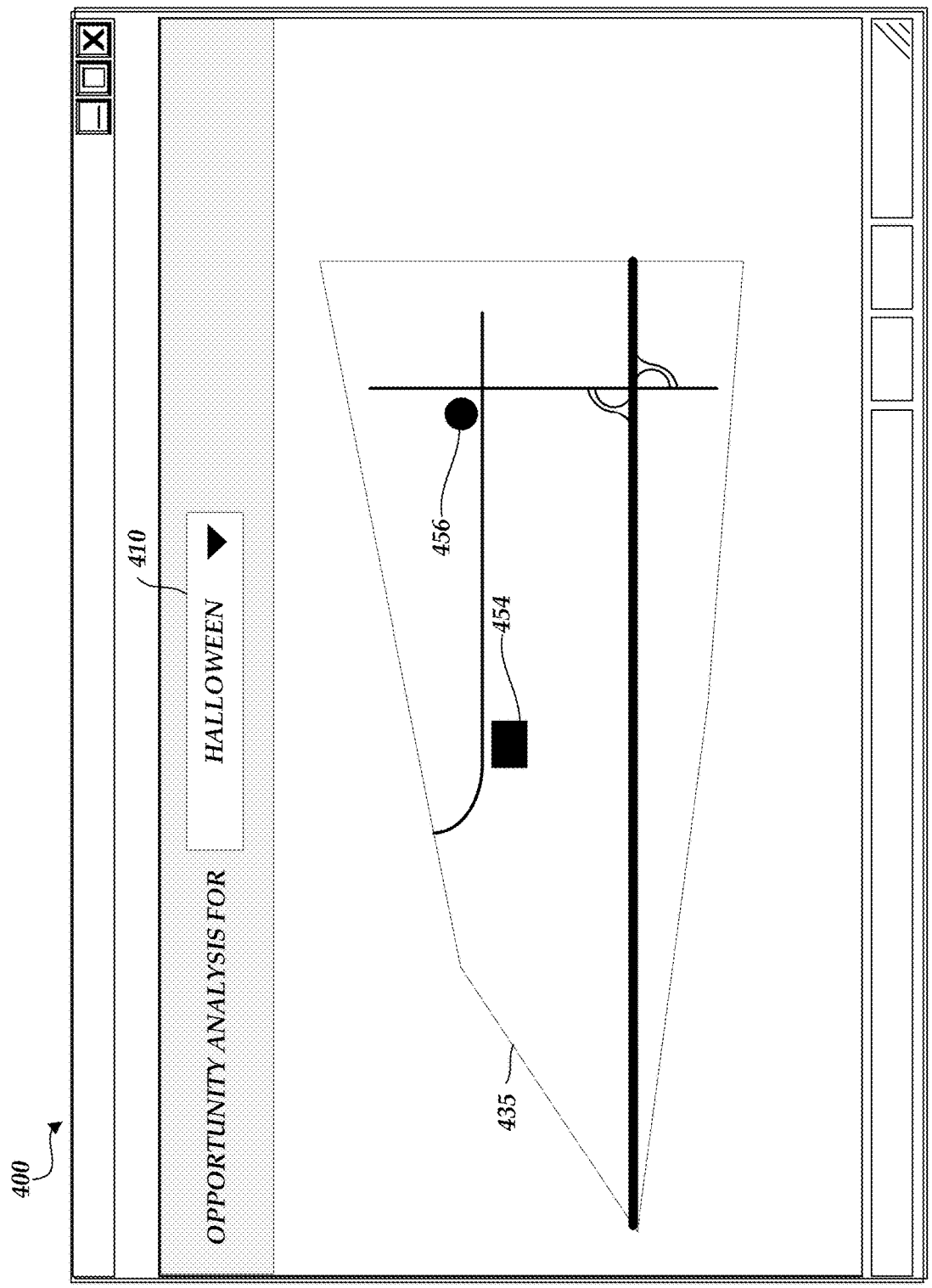

In an embodiment, the map 430 is interactive and the user can select a shipment geographic region to view additional information. For example, a selection of the shipment geographic region 435 provides an expanded view of the shipment geographic region 435 in the user interface 400, as illustrated in FIG. 4F. The expanded view of the shipment geographic region 435 can include a map of the terrain and a depiction of the location of stores, warehouses, and/or distributors within the boundaries of the shipment geographic region 435. For example, warehouse 454 and store 456 are both located within the shipment geographic region 435 (e.g., as determined by the geographic entity locator 144). Stores, warehouses, and/or distributors can be represented by different icons and/or colors to differentiate the different entities. Any of the depicted entities can be selected to view additional information, such as the information illustrated in FIGS. 4D, 4H, and/or 4I (e.g., the information in tables 412, 462, and/or 472, such as the data related to shipment misalignment).

Figure 4H:
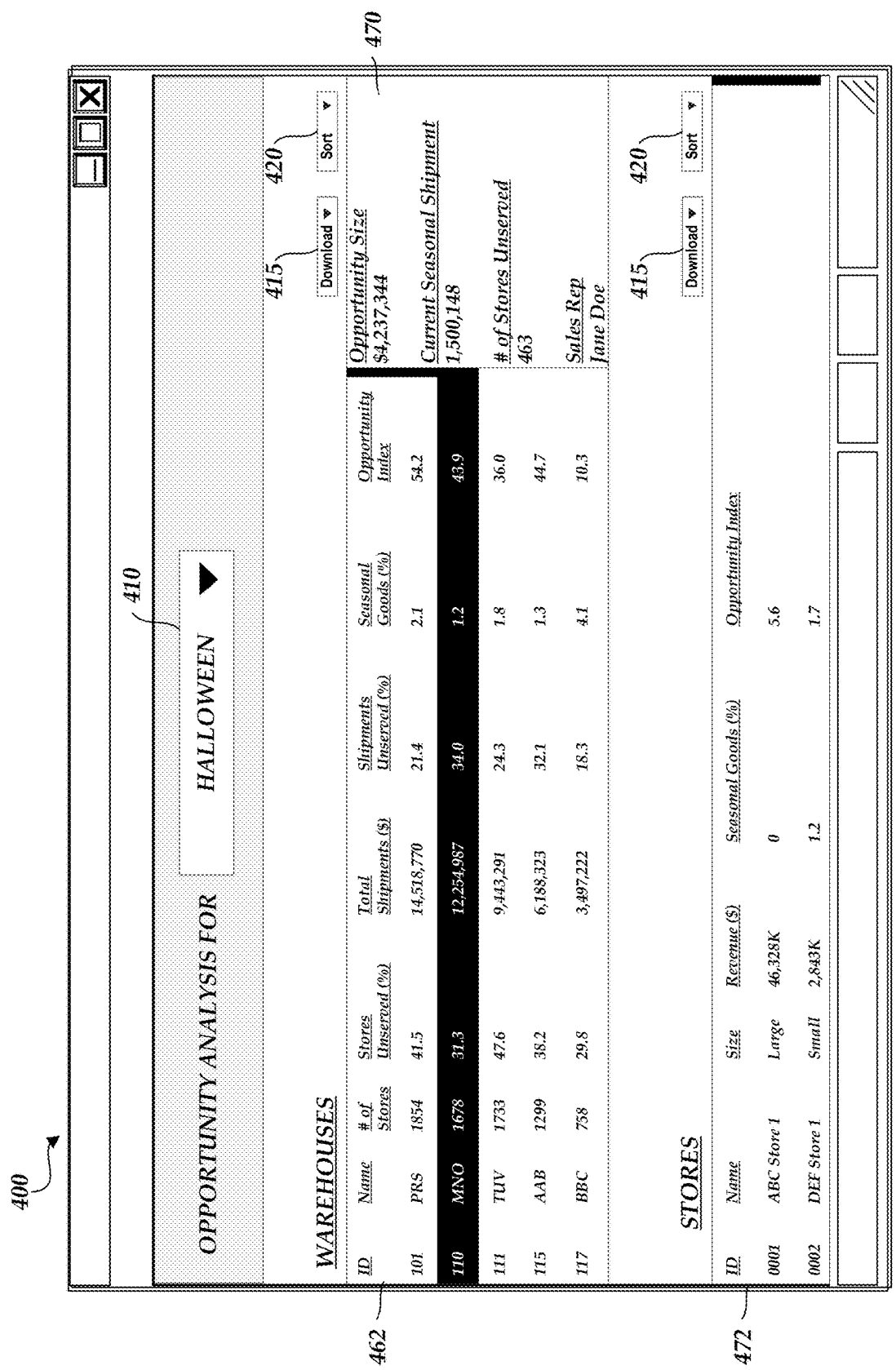

Once a distributor is selected in FIG. 4D, information on the warehouses and/or stores supplied by the selected distributor can be displayed, as illustrated in FIGS. 4G through 4I. As illustrated in FIG. 4G, the user interface 400 includes a table 462 that provides information on warehouses supplied by the selected distributor. The information can include a warehouse ID, a warehouse name, a number of stores supplied by the warehouse, a percentage of unserved stores (e.g., the percentage of stores supplied by the warehouse that do not receive the subcategory of the item), the total shipments made by the warehouse (e.g., of all subcategories of the item), the percentage of unserved shipments (e.g., the percentage of shipments that do not include the subcategory of the item), the percentage of seasonal goods (e.g., the percentage of total sales of the item that are sales of the subcategory of the item), and the opportunity index (e.g., the opportunity score). Thus, the table 462 identifies the warehouses that are associated with stores in which there may be a high amount or low amount of shipment misalignment.

The table 462 is interactive and selection of a warehouse via the cursor 450 causes the user interface 400 to display additional information, as illustrated in FIG. 4H. For example, if MNO is selected using the cursor 450, the user interface 400 displays the opportunity size (e.g., the potential increase in revenue if additional items in the subcategory are shipped to stores by the warehouse, calculated based on the opportunity index), the current seasonal shipment (e.g., the amount of the items in the subcategory that are currently shipped), the number of stores unserved (e.g., the number of stores of the warehouse multiplied by the percent of stores unserved), and the sales representative of MNO in window 470.

As illustrated in FIGS. 4H and 4I, the user interface 400 includes a table 472 that provides information on stores supplied by the selected distributor and/or warehouse. The information can include a store ID, a store name, a store size, revenue generated by the store (e.g., in sales of all subcategories of the item), the percentage of seasonal goods (e.g., the percentage of total sales of the item that are sales of the subcategory of the item), and the opportunity index (e.g., the opportunity score). Thus, the table 472 identifies the stores in which there may be a high amount or low amount of shipment misalignment.

In further embodiments, not shown, the user interface 400 provides the user with the functionality to generate instructions for the shipment routing system 130. For example, the user can select any distributor, warehouse, and/or store and be provided with a window that allows the user to define an instruction (e.g., increase the shipment of an item in a subcategory to a specific store by a certain amount) or select an instruction generated automatically based on the distributor, warehouse, and/or store information provided in tables 412, 462, and/or 472. Once completed, the shipment misalignment detection server 140 can forward the instruction to the shipment routing system 130 via the network 120.

In some embodiments, the shipment opportunity identifier 146 causes the user interface generator 148 to generate and/or display an alert and/or notification when shipment misalignment is detected. The alert and/or notification can be automatically transmitted by the shipment misalignment detection server 140 to the user device 160 for the benefit of a user associated with the alert and/or notification. The alert and/or notification can be transmitted at the time that the alert and/or notification is generated or at some determined time after generation of the alert and/or notification. When received by the user device 160, the alert and/or notification can cause the user device 160 to display the alert and/or notification via the activation of an application on the user device 160 (e.g., a browser, a mobile application, etc.). For example, receipt of the alert and/or notification may automatically activate an application on the user device 160, such as a messaging application (e.g., SMS or MMS messaging application), a standalone application (e.g., a shipment data monitoring application), or a browser, for example, and display information included in the alert and/or notification. If the user device 160 is offline when the alert and/or notification is transmitted, the application may be automatically activated when the user device 160 is online such that the alert and/or notification is displayed. As another example, receipt of the alert and/or notification may cause a browser to open and be redirected to a login page generated by the shipment misalignment detection server 140 so that the entity can log in to the shipment misalignment detection server 140 and view the alert and/or notification. Alternatively, the alert and/or notification may include a URL of a webpage (or other online information) associated with the alert and/or notification, such that when the user device 160 (e.g., a mobile device) receives the alert, a browser (or other application) is automatically activated and the URL included in the alert and/or notification is accessed via the Internet.

Example Process Flows

Figure 5:
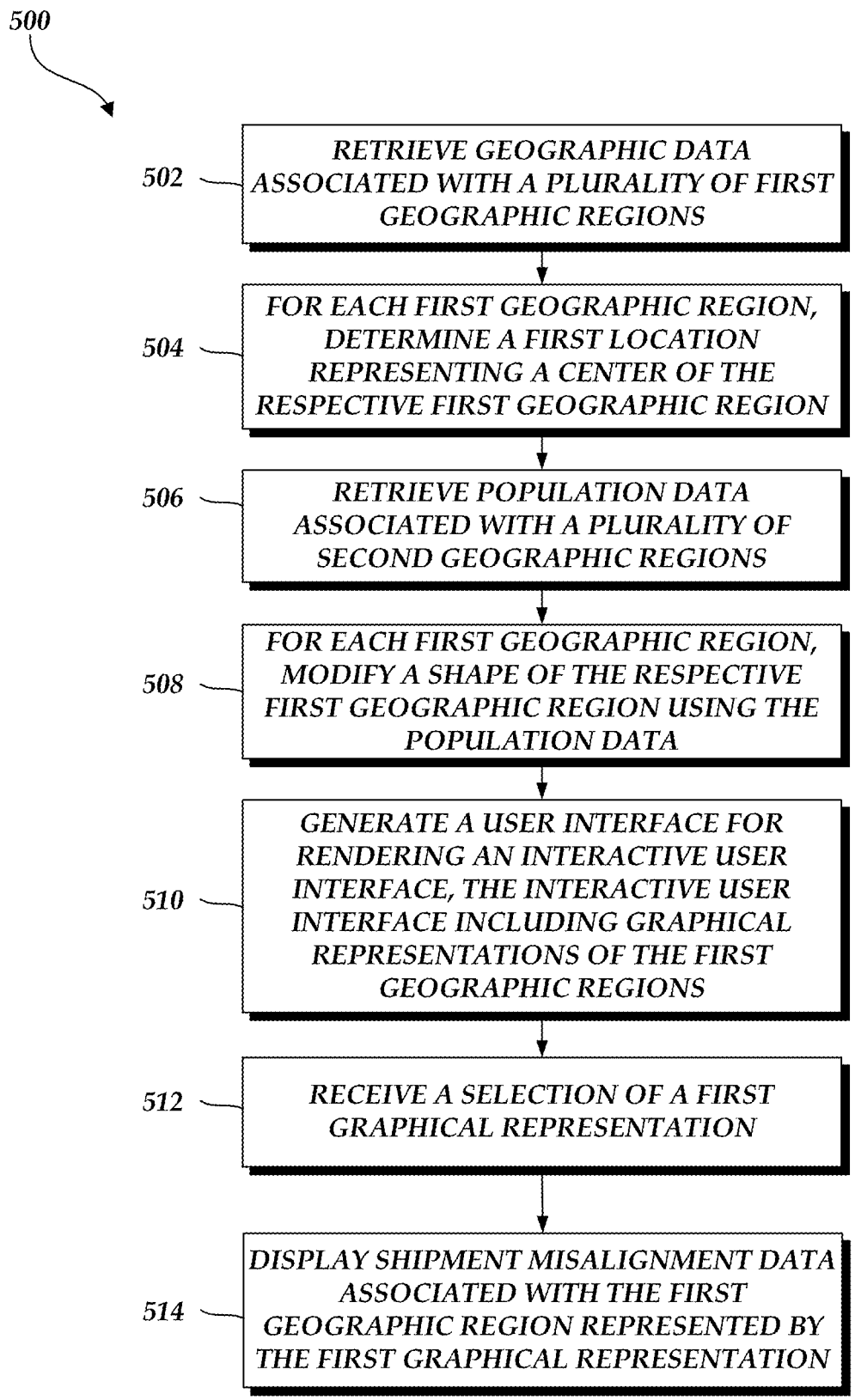
FIG. 5 is a flowchart depicting an illustrative operation of identifying shipment misalignment.

FIG. 5 is a flowchart 500 depicting an illustrative operation of identifying shipment misalignment. The method of FIG. 5 may be performed by various computing devices, such as by the shipment misalignment detection server 140 described above. Depending on the embodiment, the method of FIG. 5 may include fewer and/or additional blocks and the blocks may be performed in an order different than illustrated.

At block 502, geographic data associated with a plurality of first geographic regions is retrieved. For example, the first geographic regions can be zones and the retrieved data can include the lists of cities and the lists of states that define the zones.

At block 504, for each first geographic region, a first location is determined that represents a center of the respective first geographic region. For example, the center can be determined by identifying possible combinations of cities and states from the two lists and taking an average of the geographic locations of some of the possible combinations.

At block 506, population data associated with a plurality of second geographic regions is retrieved. The retrieved population data may include the size and location of census tracts.

At block 508, for each first geographic region, a shape of the respective first geographic region is modified using the population data. For example, census tracts that are located within a vicinity of the center of the respective first geographic region can be combined to form the size, shape, and location of the respective first geographic region (e.g., where the first geographic regions are now shipment geographic regions).

At block 510, a user interface for rendering an interactive user interface is generated, where the interactive user interface includes graphical representations of the first geographic regions. In an embodiment, the graphical representations are shaded to indicate a demand for an item or a subcategory of an item in the first geographic regions.

At block 512, a selection of a first graphical representation is received. In an embodiment, selection of the first graphical representation causes the user interface to display the locations of various stores, warehouses, and/or distributors in the first geographic region associated with the first graphical representation.

At block 514, shipment misalignment data associated with the first geographic region is displayed. For example, the user can select a store or warehouse in the first geographic region, which causes the user interface to display shipment misalignment data, such as the opportunity index and/or other information provided in tables 412, 462, and/or 472.

Figure 6:
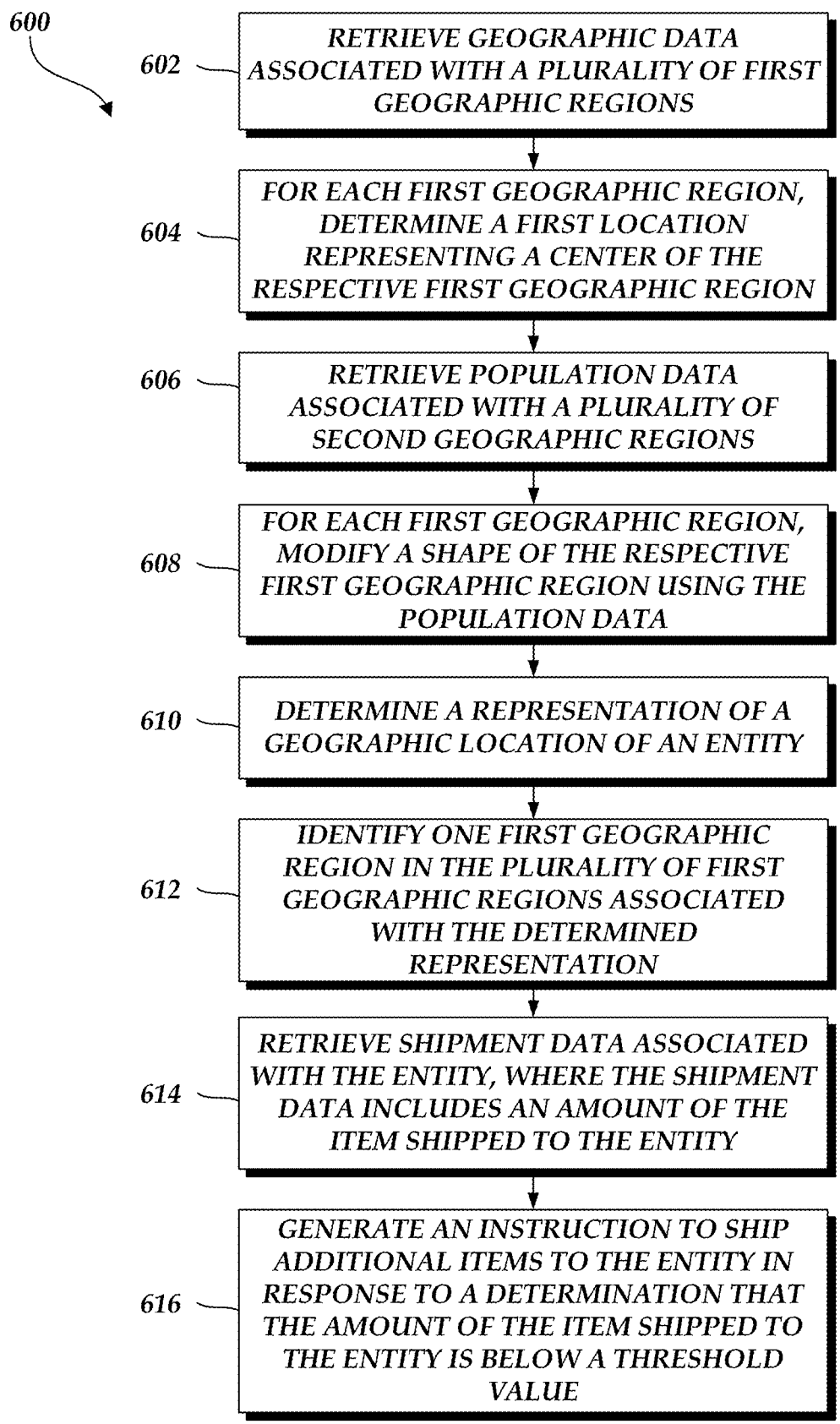
FIG. 6 is a flowchart depicting an illustrative operation of correcting shipment misalignment.

FIG. 6 is a flowchart 600 depicting an illustrative operation of correcting shipment misalignment. The method of FIG. 6 may be performed by various computing devices, such as by the shipment misalignment detection server 140 described above. Depending on the embodiment, the method of FIG. 6 may include fewer and/or additional blocks and the blocks may be performed in an order different than illustrated.

At block 602, geographic data associated with a plurality of first geographic regions is retrieved. For example, the first geographic regions can be zones and the retrieved data can include the lists of cities and the lists of states that define the zones.

At block 604, for each first geographic region, a first location is determined that represents a center of the respective first geographic region. For example, the center can be determined by identifying possible combinations of cities and states from the two lists and taking an average of the geographic locations of some of the possible combinations.

At block 606, population data associated with a plurality of second geographic regions is retrieved. The retrieved population data may include the size and location of census tracts.

At block 608, for each first geographic region, a shape of the respective first geographic region is modified using the population data. For example, census tracts that are located within a vicinity of the center of the respective first geographic region can be combined to form the size, shape, and location of the respective first geographic region (e.g., where the first geographic regions are now shipment geographic regions).

At block 610, a representation of a geographic location of an entity is determined. For example, the representation can be a set of geographic coordinates.

At block 612, one first geographic region in the plurality of first geographic regions associated with the determined representation is identified. For example, the boundaries of the one first geographic region can be defined by a list of geographic coordinates and the determined representation of the geographic location of the entity can be associated with this one first geographic region if the determined representation falls within the range of geographic coordinates included in the list.

At block 614, shipment data associated with the entity is retrieved, where the shipment data includes an amount of the item shipped to the entity.

At block 616, an instruction is generated to ship additional items to the entity in response to a determination that the amount of the item shipped to the entity is below a threshold value. For example, the instruction can be generated if the amount of the items shipped to the entity is below an amount that represents the demand of the item in the first geographic region of the entity.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
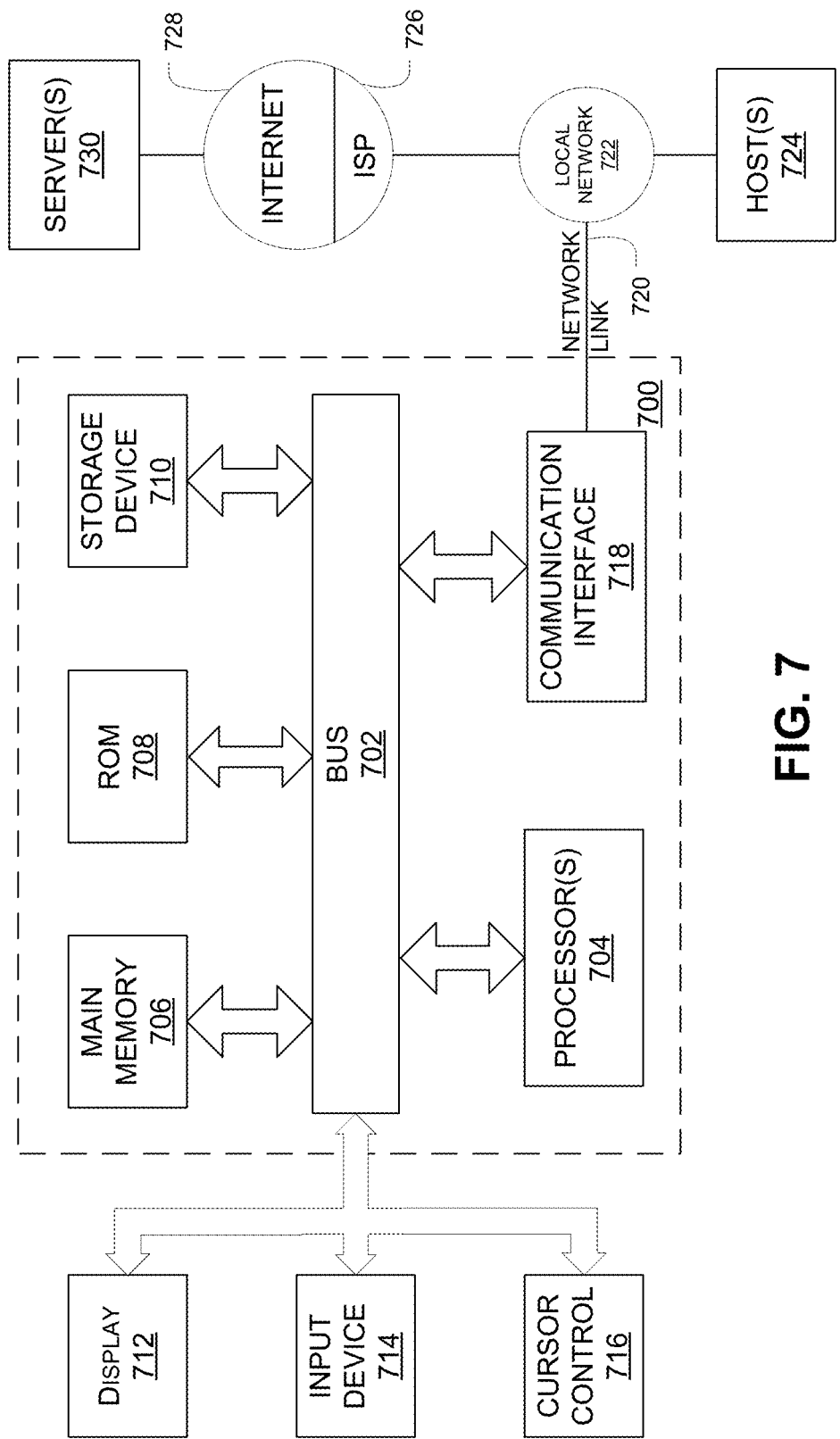
FIG. 7 illustrates a computer system with which certain methods discussed herein may be implemented, according to one embodiment.

For example, FIG. 7 is a block diagram that illustrates a computer system 700 upon which an embodiment may be implemented. For example, any of the computing devices discussed herein may include some or all of the components and/or functionality of the computer system 700.

Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. Main memory 706 may also store cached data, such as generated shipment geographic regions, identified locations of stores, warehouses, and/or distributors in shipment geographic regions, shipment misalignment data for a selected (and/or unselected) shipment geographic region, zoom levels of viewed shipment geographic regions in a map (e.g., the map 430), and/or the like.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions. For example, the storage device 710 may store the size, shape, and location of generated shipment geographic regions, an identification of a shipment geographic region a store, warehouse, and/or distributor is located within, shipment misalignment data, and/or the like.

Computer system 700 may be coupled via bus 702 to a display 712, such as a cathode ray tube (CRT) or LCD display (or touch screen), for displaying information to a computer user. For example, the display 712 can be used to display any of the user interfaces described herein with respect to FIGS. 2A through 17D. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 406, from which processor 704 retrieves and executes the instructions. The instructions received by main memory 706 may retrieve and execute the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electro-magnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating or otherwise vexing to user.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method comprising:
   generating graphical representations of a plurality of geographic regions;
   generating user interface data for rendering an interactive user interface on a computing device, wherein the interactive user interface includes:
      a map representing a large geographic region, wherein the map displays the graphical representations of the plurality of geographic regions at locations within the large geographic region; and
      a table displaying information associated with the plurality of geographic regions, wherein the information includes at least one of: names, a number of associated stores, a percentage of unserved stores, total shipments made, a percentage of unserved shipments, a percentage of a category of goods, and an opportunity index;
   receiving a selection of a first graphical representation of a first geographic region in the plurality of geographic regions;
   modifying the user interface data such that the interactive user interface displays an expanded view of the map, wherein the expanded view of the map includes an identification of a location of one or more entities located within the first geographic region and hides geographic regions in the plurality of geographic regions other than the first geographic region;
   receiving a selection of a first entity in the one or more entities located within the first geographic region;
   modifying the modified user interface data such that the interactive user interface displays shipment misalignment data associated with the first entity selected within the first geographic region;
   in response to an alert generated based on a determination that a shipment misalignment is detected, modifying the modified user interface data such that the interactive user interface displays a notification that shipment misalignment is detected;
   modifying, in response to the selection of the first entity within the first geographic region, the modified user interface data such that the interactive user interface includes a selectable option to ship additional items to the first entity; and
   in response to selection of the selectable option via the interactive user interface, generating an instruction to increase or decrease shipment of the additional items to the first entity.

2. The computer-implemented method of claim 1, wherein the graphical representations of the plurality of geographic regions are each shaded a color corresponding to a demand for an item in the respective geographic region.

3. The computer-implemented method of claim 1, wherein the first graphical representation of the first geographic region has an appearance that indicates a demand for an item in the first geographic region.

4. The computer-implemented method of claim 1, wherein a first category of items is a first subcategory of a second category of items, and wherein the computer-implemented method further comprises:
   determining, for the first geographic region, a first percentage of sales of the second category of items that are sales of the first category of items using micro-market data stored in a first database;
   determining, for the first geographic region, a second percentage of shipments of the second category of items to the first geographic region that are shipments of the first category of items using shipment data stored in a second database; and
   generating a first opportunity score that indicates shipment misalignment has occurred in response to a determination that the first percentage is greater than the second percentage.

5. The computer-implemented method of claim 4, wherein the displayed shipment misalignment data comprises the first opportunity score.

6. The computer-implemented method of claim 5, wherein a third category of items is a second subcategory of the second category of items, and wherein the computer-implemented method further comprises:
   receiving a selection of the third category of items;
   determining, for the first geographic region, a third percentage of sales of the second category of items that are sales of the third category of items using the micro-market data;
   determining, for the first geographic region, a fourth percentage of shipments of the second category of items to the first geographic region that are shipments of the third category of items using the shipment data;

generating a second opportunity score that indicates shipment misalignment has occurred in response to a determination that the third percentage is greater than the fourth percentage; and modifying the modified user interface data such that the shipment misalignment data comprises the second opportunity score.

7. The computer-implemented method of claim 1, further comprising retrieving shipment data associated with the first geographic region from a database, wherein the shipment data comprises an amount of an item shipped to the first geographic region.

8. The computer-implemented method of claim 1, wherein the one or more entities comprise at least one of a store, a warehouse, or a distributor.

9. The computer-implemented method of claim 8, wherein the store is represented by a first icon depicted in the expanded view of the map, the warehouse is represented by a second icon depicted in the expanded view of the map, and the distributor is represented by a third icon depicted in the expanded view of the map.

10. The computer-implemented method of claim 1, further comprising modifying, in response to the selection of the first entity within the first geographic region, the modified user interface data such that the interactive user interface includes information on at least one second entity in the one or more entities that is related to the first entity.

11. The computer-implemented method of claim 1, wherein the one or more entities comprise at least one of a first type of building, a second type of building, or a third type of building, wherein each of the first, second, and third types of buildings is represented by a different icon in the expanded view of the map.

12. A computing system comprising:
a shipment routing system; and
a processor configured with executable code that, when executed, causes the processor to:
generate graphical representations of a plurality of geographic regions;
generate user interface data for rendering an interactive user interface on a computing device, wherein the interactive user interface includes:
a map representing a large geographic region, wherein the map displays the graphical representations of the plurality of geographic regions at locations within the large geographic region; and
a table displaying information associated with the plurality of geographic regions, wherein the information includes at least one of: names, a number of associated stores, a percentage of unserved stores, total shipments made, a percentage of unserved shipments, a percentage of a category of goods, and an opportunity index;
receive a selection of a first graphical representation of a first geographic region in the plurality of geographic regions;
modify the user interface data such that the interactive user interface displays an expanded view of the map, wherein the expanded view of the map includes an identification of a location of one or more entities located within the first geographic region and hides geographic regions in the plurality of geographic regions other than the first geographic region;
receive a selection of a first entity in the one or more entities located within the first geographic region;
modify the modified user interface data such that the interactive user interface displays shipment misalignment data associated with the first entity selected within the first geographic region;
in response to an alert generated based on a determination that a shipment misalignment is detected, modify the modified user interface data such that the interactive user interface displays a notification that shipment misalignment is detected;
modify, in response to the selection of the first entity within the first geographic region, the modified user interface data such that the interactive user interface includes a selectable option to instruct the shipment routing system to ship additional items to the first entity; and
in response to selection of the selectable option via the interactive user interface, generate an instruction to increase or decrease shipment of the additional items to the first entity.

13. The computing system of claim 12, wherein the first graphical representation of the first geographic region has an appearance that indicates a demand for an item in the first geographic region.

14. The computing system of claim 12, wherein a first category of items is a first subcategory of a second category of items, and wherein the executable code, when executed, further causes the processor to:
determine, for the first geographic region, a first percentage of sales of the second category of items that are sales of the first category of items using micro-market data stored in a first database;
determine, for the first geographic region, a second percentage of shipments of the second category of items to the first geographic region that are shipments of the first category of items using shipment data stored in a second database; and
generate a first opportunity score that indicates shipment misalignment has occurred in response to a determination that the first percentage is greater than the second percentage.

15. The computing system of claim 14, wherein the displayed shipment misalignment data comprises the first opportunity score.

16. The computing system of claim 15, wherein a third category of items is a second subcategory of the second category of items, and wherein the executable code, when executed, further causes the processor to:
receive a selection of the third category of items;
determine, for the first geographic region, a third percentage of sales of the second category of items that are sales of the third category of items using the micro-market data;
determine, for the first geographic region, a fourth percentage of shipments of the second category of items to the first geographic region that are shipments of the third category of items using the shipment data;
generate a second opportunity score that indicates shipment misalignment has occurred in response to a determination that the third percentage is greater than the fourth percentage; and
modify the modified user interface data such that the shipment misalignment data comprises the second opportunity score.

17. The computing system of claim 12, wherein the one or more entities comprise at least one of a store, a warehouse, or a distributor.

18. The computing system of claim 17, wherein the store is represented by a first icon depicted in the expanded view of the map, the warehouse is represented by a second icon depicted in the expanded view of the map, and the distributor is represented by a third icon depicted in the expanded view of the map.

19. A non-transitory computer-readable medium comprising one or more program instructions recorded thereon, the one or more program instructions configured for execution by a computing system comprising one or more processors in order to cause the computing system to:

generate graphical representations of a plurality of geographic regions;

generate user interface data for rendering an interactive user interface on a computing device, wherein the interactive user interface includes:

a map representing a large geographic region, wherein the map displays the graphical representations of the plurality of geographic regions at locations within the large geographic region; and a table displaying information associated with the plurality of geographic regions, wherein the information includes at least one of: names, a number of associated stores, a percentage of unserved stores, total shipments made, a percentage of unserved shipments, a percentage of a category of goods, and an opportunity index;

receive a selection of a first graphical representation of a first geographic region in the plurality of geographic regions;

modify the user interface data such that the interactive user interface displays an expanded view of the map, wherein the expanded view of the map includes an identification of a location of one or more entities located within the first geographic region and hides geographic regions in the plurality of geographic regions other than the first geographic region;

receive a selection of a first entity in the one or more entities located within the first geographic region;

modify the modified user interface data such that the interactive user interface displays shipment misalignment data associated with the first entity selected within the first geographic region;

in response to an alert generated based on a determination that a shipment misalignment is detected, modify the modified user interface data such that the interactive user interface displays a notification that shipment misalignment is detected;

modify, in response to the selection of the first entity within the first geographic region, the modified user interface data such that the interactive user interface includes a selectable option to ship additional items to the first entity; and in response to selection of the selectable option via the interactive user interface, generate an instruction to increase or decrease shipment of the additional items to the first entity.

20. The non-transitory computer-readable medium of claim 19, wherein the first graphical representation of the first geographic region has an appearance that indicates a demand for an item in the first geographic region.

21. The non-transitory computer-readable medium of claim 19, wherein the one or more entities comprise at least one of a store, a warehouse, or a distributor, and wherein the store is represented by a first icon depicted in the expanded view of the map, the warehouse is represented by a second icon depicted in the expanded view of the map, and the distributor is represented by a third icon depicted in the expanded view of the map.

\* \* \* \* \*